US012662616B2

(12) United States Patent     (10) Patent No.:   US 12,662,616 B2
Jesme et al.     (45) Date of Patent:   Jun. 23, 2026

(54) TETRAHEDRAL SHAPED ABRASIVE PARTICLES WITH PREDETERMINED RAKE ANGLES

(71) Applicant: 3M INNOVATIVE PROPERTIES COMPANY, St. Paul, MN (US)

(72) Inventors: Ronald D. Jesme, Plymouth, MN (US); Joseph B. Eckel, Vadnais Heights, MN (US); Thomas J. Nelson, Woodbury, MN (US); Aaron K Nienaber, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 939 days.

(21) Appl. No.: 17/309,099

(22) PCT Filed: Oct. 24, 2019

(86) PCT No.: PCT/IB2019/059112
§ 371 (c)(1),
(2) Date: Apr. 23, 2021

(87) PCT Pub. No.: WO2020/089741
PCT Pub. Date: May 7, 2020

(65) Prior Publication Data
US 2021/0388250 A1    Dec. 16, 2021

Related U.S. Application Data

(60) Provisional application No. 62/754,225, filed on Nov. 1, 2018.

(51) Int. Cl.
*C09K 3/14*    (2006.01)
*B24D 11/00*    (2006.01)
*B24D 11/02*    (2006.01)

(52) U.S. Cl.
CPC .......... *C09K 3/1409* (2013.01); *B24D 11/005* (2013.01); *B24D 11/02* (2013.01)

(58) Field of Classification Search
CPC ...... C09K 3/1409; B24D 11/005; B24D 11/02
See application file for complete search history.

(56) References Cited

U.S. PATENT DOCUMENTS 3,859,407 A   *   1/1975   Blanding  .............. C03B 11/082
                           241/3
RE35,570 E   *   7/1997   Rowenhorst  ......... C09K 3/1418
                           51/293

(Continued)

FOREIGN PATENT DOCUMENTS

WO    WO-2011109188 A2 *   9/2011  ............. B24B 37/04
WO    WO 2018-081044      5/2018

(Continued)

OTHER PUBLICATIONS

Jackson, Frank and Weisstein, Eric W. "Regular Tetrahedron." From MathWorld—A Wolfram Web Resource. https://mathworld.wolfram.com/RegularTetrahedron.html (Year: 2024).*

(Continued)

*Primary Examiner* — Alexandra M Moore
(74) *Attorney, Agent, or Firm* — Melissa E. Buss; Katherine M. Scholz

(57) ABSTRACT

Various embodiments disclosed relate to a shaped abrasive particle. The shaped abrasive particle includes at least four major faces and at least six edges joining the four major faces. One of the at least four major faces is a first rake face, a second of the at least four major faces is a second rake face. The first and second rake faces are predominantly joined along only one common edge. A dihedral angle between the first rake face and the second rake face is in a range of from about 71 degrees to about 170 degrees.

10 Claims, 9 Drawing Sheets

(56) References Cited

U.S. PATENT DOCUMENTS

| 5,672,097 | A | * | 9/1997 | Hoopman | .............. | B24D 18/00 |
| | | | | | | 451/526 |
| 7,727,931 | B2 | | 6/2010 | Brey | | |
| 8,142,531 | B2 | * | 3/2012 | Adefris | ................ | B24D 11/001 |
| | | | | | | 428/142 |
| 8,698,394 | B2 | | 4/2014 | McCutcheon | | |
| 8,728,185 | B2 | | 5/2014 | Adefris | | |
| 2010/0151196 | A1 | * | 6/2010 | Adefris | ................ | C09K 3/1409 |
| | | | | | | 428/142 |
| 2013/0040537 | A1 | * | 2/2013 | Schwabel | .......... | B24D 18/0009 |
| | | | | | | 451/28 |

FOREIGN PATENT DOCUMENTS

| WO | WO-2018081044 | A1 | * | 5/2018 | ......... | C04B 35/6316 |
| WO | WO 2018-118596 | | | 6/2018 | | |

OTHER PUBLICATIONS

Barbee, "Microstructure of amorphous 304 stainless steel-carbon alloys synthesized by magnetron sputter deposition", Thin Solid Films, Oct. 1979, vol. 63, No. 1, pp. 143-150.
International Search Report for PCT International Application No. PCT/IB2019/059112, mailed on Jan. 7, 2020, 5 pages.

\* cited by examiner

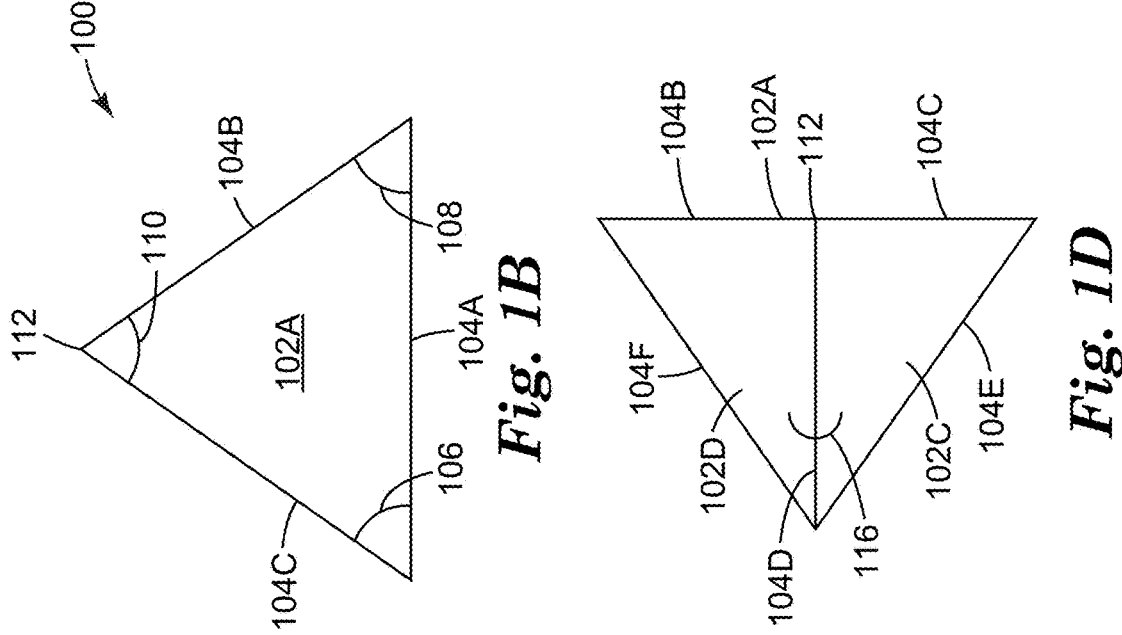
*Fig. 1B*
*Fig. 1D*
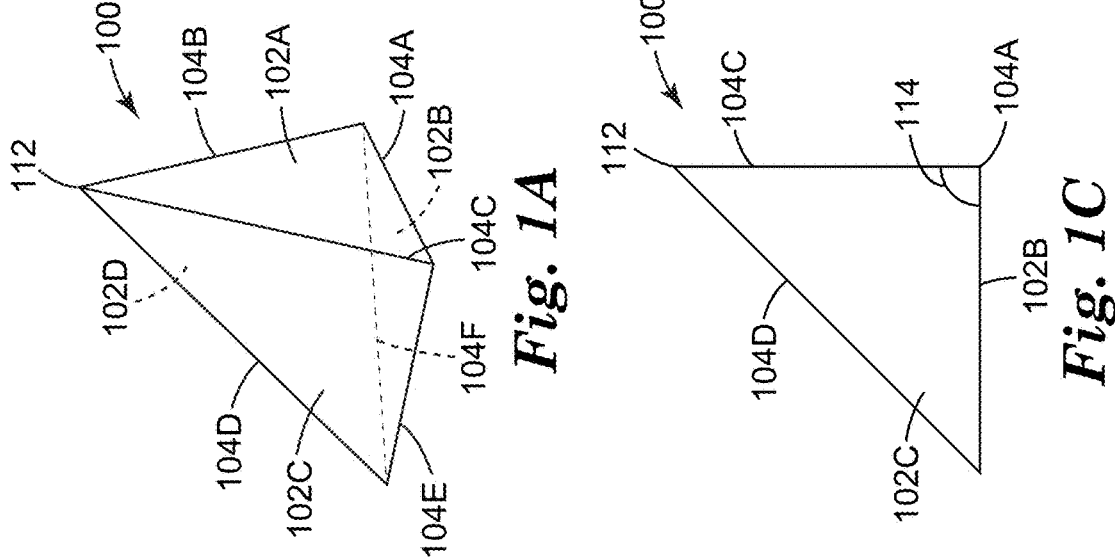
*Fig. 1A*
*Fig. 1C*

TETRAHEDRAL SHAPED ABRASIVE PARTICLES WITH PREDETERMINED RAKE ANGLES

CROSS REFERENCE TO RELATED APPLICATIONS

This application is a national stage filing under 35 U.S.C. 371 of PCT/IB2019/059112, filed Oct. 24, 2019, which claims the benefit of U.S. Provisional Application No. 62/754,225 filed Nov. 1, 2018, the disclosure of which is incorporated by reference in its/their entirety herein.

BACKGROUND

Abrasive particles and abrasive articles including the abrasive particles are useful for abrading, finishing, or grinding a wide variety of materials and surfaces in the manufacturing of goods. As such, there continues to be a need for improving the cost, performance, or life of abrasive particles or abrasive articles.

SUMMARY OF THE DISCLOSURE

Various embodiments disclosed relate to a shaped abrasive particle. The shaped abrasive particle includes at least four major faces and at least six edges joining the four major faces. One of the at least four major faces is a first rake face, a second of the at least four major faces is a second rake face. The first and second rake faces are predominantly joined along only one common edge. A dihedral angle between the first rake face and the second rake face is in a range of from about 71 degrees to about 170 degrees.

Various further embodiments disclosed relate to a method of making a shaped abrasive particle. The shaped abrasive particle includes at least four major faces and at least six edges joining the four major faces. One of the at least four major faces is a first rake face, a second of the at least four faces is a second rake face. The first and second rake faces are predominantly joined along only one common edge. A dihedral angle between the first rake face and the second rake face is in a range of from about 71 degrees to about 170 degrees. The method includes disposing an abrasive particle precursor composition in a mold cavity conforming to the negative image of the shaped abrasive particle. The method further includes drying the abrasive particle precursor to form the shaped abrasive particle. In some embodiments the abrasive particle can optionally be subjected to a firing process.

Various further embodiments disclosed relate to an abrasive article. The abrasive article includes a backing. The abrasive article further includes a plurality of shaped abrasive particles attached to the backing. The shaped abrasive particles, individually, include at least four major faces and at least six edges joining the four major faces. One of the at least four faces is a first rake face, a second of the at least four major faces is a second rake face. The first and second rake faces are predominantly joined along only one common edge. A dihedral angle between the first rake face and the second rake face is in a range of from about 71 degrees to about 170 degrees.

Various further embodiments disclosed relate to a method of making an abrasive article. The method includes adhering shaped abrasive particles to the backing. The shaped abrasive particles, individually, include at least four major faces and at least six edges joining the four major faces. One of the at least four major faces is a first rake face, a second of the at least four major faces is a second rake face. The first and second rake faces are predominantly joined along only one common edge. A dihedral angle between the first rake face and the second rake face is in a range of from about 71 degrees to about 170 degrees.

Various further embodiments disclosed relate to a method of using an abrasive article. The abrasive article includes a backing. The abrasive article further includes a plurality of shaped abrasive particles attached to the backing. The shaped abrasive particles, individually, include at least four major faces and at least six edges joining the four faces. One of the at least four major faces is a first rake face, a second of the at least four faces is a second rake face. The first and second rake faces are predominantly joined along only one common edge. A dihedral angle between the first rake face and the second rake face is in a range of from about 71 degrees to about 170 degrees. The method includes contacting the shaped abrasive particles with a workpiece. The method further includes moving at least one of the abrasive article and the workpiece relative to each other in the direction of use. The method further includes removing a portion of the workpiece.

There are many reasons to use the shaped abrasive particles and articles including the shaped abrasive particles described herein including the following non-limiting reasons. For example, according to various embodiments, the dihedral angle between rake faces of the shaped abrasive particle or rake angle measured between a backing of the abrasive article and the shaped abrasive particle can be configured to greatly enhance the abrasive performance of the shaped abrasive particle. According to various embodiments, controlling the dihedral angle of an abrasive particle or the rake angle between an abrasive particle and a backing of an abrasive article, to which the abrasive particle is attached, can greatly affect the abrasive performance of the particle and article. For example, the shaped abrasive particle can remove more material than a corresponding particle that is free of the disclosed dihedral angle or article free of the disclosed rake angle. According to various embodiments, the increase in performance is pronounced compared to abrasive particles that are regular tetrahedrons, or to abrasive articles that include regular tetrahedron shaped abrasive particles.

BRIEF DESCRIPTION OF THE FIGURES

The drawings illustrate generally, by way of example, but not by way of limitation, various embodiments discussed in the present document.

FIG. 1A is a perspective view of a shaped abrasive particle, in accordance with various embodiments.

FIG. 1B is a front view of a shaped abrasive particle, in accordance with various embodiments.

FIG. 1C is a side view of a shaped abrasive particle, in accordance with various embodiments.

FIG. 1D is a top view of a shaped abrasive particle, in accordance with various embodiments.

DETAILED DESCRIPTION

Figure 2A:
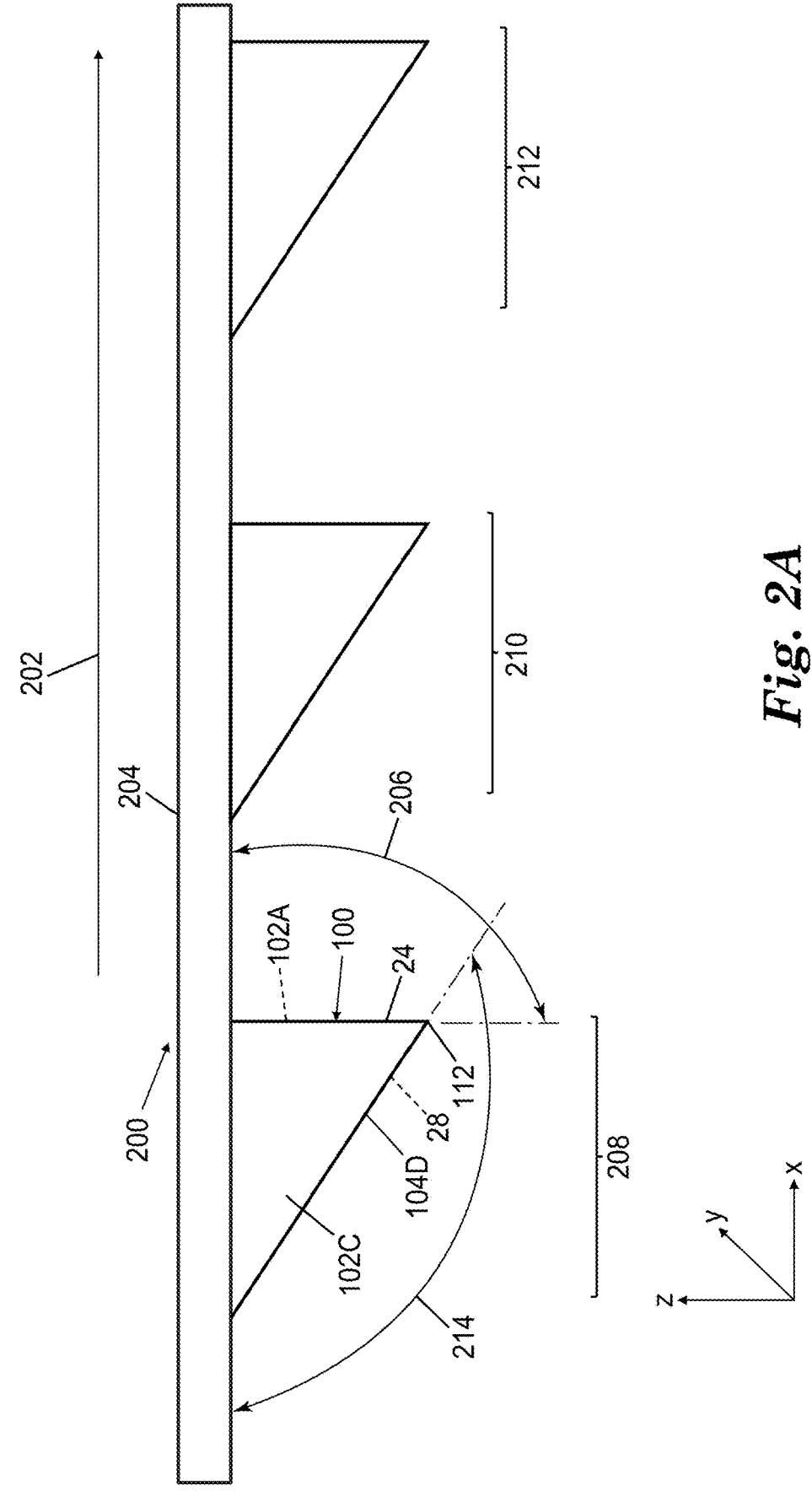
FIG. 2A is a side view of an abrasive belt, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

According to various embodiments of the present disclosure, shaped abrasive particles are designed to include a predetermined rake angle. The rake angle can have a value chosen to increase the abrasive performance of the shaped abrasive particle and any abrasive article including one or more of the shaped abrasive particles. FIGS. 1A-1D provide various views of shaped abrasive particle 100. FIGS. 1A-1D show many of the same features and are discussed concurrently. FIG. 1A is a perspective view of shaped abrasive particle 100. FIG. 1B is a front view of shaped abrasive particle 100. FIG. 1C is a side view of shaped abrasive particle 100. FIG. 1D is a top view of shaped abrasive particle 100.

As shown in FIGS. 1A-1D, shaped abrasive particle 100 is a generally tetrahedral particle. Shaped abrasive particle 100 includes four major faces 102 (102A, 102B, 102C, and 102D). Shaped abrasive particle 100 further includes six edges 104 (104A, 104B, 104C, 104D, 104E, and 104F). Edges 104 join faces 102. Of faces 102, faces 102A and 102B can be designated as rake faces that are joined along common edge 104A. As described further herein, a dihedral angle measured between rake faces 102A and 102B, across common edge 104A, can be designed to increase the abrasive performance of shaped abrasive particles 100 and any abrasive article including shaped abrasive particles 100.

To give shaped abrasive particle 100 its tetrahedral shape, each of faces 102 has a generally triangular shape. The triangular shape is formed by each of faces 102 being bound by a respective first, second, and third edge chosen from any of the six edges. The triangular shape can conform to a right triangle, a scalene triangle, an isosceles triangle, an acute triangle, or an obtuse triangle. In some embodiments, the triangular shape can substantially conform to an equilateral triangle, but in other embodiments, none of the triangular shapes may conform to an equilateral triangle.

The shape of each face 102, can be controlled, in part, by varying the length of each edge 104. While each edge can have any suitable length, each edge can generally have a length in a range of from about 0.01 mm to about 10 mm, about 0.03 mm to about 5 mm, less than, equal to, or greater than about 0.01 mm, 0.05, 0.1, 0.5, 1, 1.5, 2, 2.5, 3, 3.5, 4, 4.5, 5, 5.5, 6, 6.5, 7, 7.5, 8, 8.5, 9, 9.5, or about 10 mm. To better demonstrate the ability to control the edges reference will be made to first edge 104A, second edge 104B, and third edge 104C, which bound first face 102A. Although the edges bounding first face 102A are discussed, the discussion is equally applicable to the respective edges 104 bounding any of faces 102. As shown in FIGS. 1A-1D, first edge 104A differs in length from second edge 104B and third edge 104C. As shown, second edge 104B and third edge 104C have substantially the same length.

First edge 104A as shown, is longer than second edge 104B and third edge 104C. First edge 104A can have any length relative to second edge 104B and 104C. For example, first edge 104A can be in a range of from about 1.03 times to about 2 times the length of second edge 104B and third edge 104C, about 1.1 times to about 1.4 times, less than, equal to, or greater than about 1.03 times, 1.04, 1.05, 1.06, 1.07, 1.08, 1.09, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, or about 2 times. Alternatively, first edge 104A can be shorter than either second edge 104B or second edge 104C. For example, first edge 104A can be in a range of from about 0.6 times to about 0.1 times the length of second edge 104B or third edge 104C, about 0.5 times to about 0.2 times, less than, equal to, or greater than about 0.6, 0.55, 0.5, 0.45, 0.4, 0.35, 0.3, 0.25, 0.2, 0.15, or about 0.1 times shorter.

The lengths of edges 104A, 104B, and 104C, can result in a variety of angles in shaped abrasive particle 100. In embodiments in which the length of second edge 104B and third edge 104C are the same, angles 106 and 108 between first edge 104A and each of second edge 104B and third edge 104C are substantially equivalent. Angles 106 and 108 can independently be in a range of from about 30 degrees to about 80 degrees, about 45 degrees to about 60 degrees, less than, equal to, or greater than about 30 degrees, 35, 40, 45, 50, 55, 60, 65, 70, 75, or about 80 degrees. Angle 110 measured between second edge 104B and third edge 104C, can be different than angles 106 and 108 and can be in a range of from about 30 degrees to about 80 degrees, about 45 degrees to about 60 degrees, less than, equal to, or greater than about 30 degrees, 35, 40, 45, 50, 55, 60, 65, 70, 75, or about 80 degrees.

In some further embodiments, first edge 104A and second edge 104B can differ in length from that of third edge 104C. For example, first edge 104A, second edge 104B, or both, can be shorter than that of third edge 104C In still further embodiments, a length of one of first edge 104A or second edge 104B can be greater than that of third edge 104C, while the other edge is shorter than that of third edge 104C. In some embodiments, where second edge 104B and third edge 104C differ in length, it is possible to offset vertex 112 formed at an intersection between second edge 104B and third edge 104C, such that the vertex is not aligned with a mid-point of first edge 104A.

First edge 104A and second edge 104B can have any length relative to third edge 104C. For example, if first edge 104A, second edge 104B, or both are longer than third edge 104C, first edge 104A and second edge 104B can be in a range of from about 1.03 times to about 2 times the length of third edge 104C, about 1.1 times to about 1.4 times, less than, equal to, or greater than about 1.03 times, 1.04, 1.05, 1.06, 1.07, 1.08, 1.09, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, or about 2 times. Alternatively, if first edge 104A, second edge 104B, or both are shorter than third edge 104C, first edge 104A or second edge 104B can be in a range of from about 0.6 times to about 0.1 times shorter than second edge 104B or third edge 104C, about 0.5 times to about 0.2 times, less than, equal to, or greater than about 0.6, 0.55, 0.5, 0.45, 0.4, 0.35, 0.3, 0.25, 0.2, 0.15, or about 0.1 times shorter.

The different lengths of edges 104A, 104B, and 104C can create variation in angle, 108 measured between first edge 104A and second edge 104B, as well as angle 106, measured between first edge 104A and third edge 104C. The variation in the angle can contribute to determining the degree of offset in shaped abrasive particle 100. The respective angles 106 and 108 between first edge 104A and second edge 104B as well as between first edge 104A and third edge 104C can be in a range of from about 30 degrees to about 85 degrees, about 50 degrees to about 75 degrees, less than, equal to, or greater than about 30 degrees, 35, 40, 45, 50, 60, 70, 80, or 85 degrees.

First rake face 102A and second rake face 102B are joined along first edge 104A. Shaped abrasive particle 100 is designed to achieve a certain dihedral angle 114 between first rake face 102A and second rake face 102B. For example, according to various embodiments, the dihedral angle between first rake face 102A and second rake face 102B, measured across first edge 104A can be in a range of from about 71 degrees to about 170 degrees, about 80 degrees to about 135 degrees, about 85 degrees to about 95 degrees, less than, equal to, or greater than about 71 degrees, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 161, 162, 163, 164, 165, 166, 167, 168, 169, or about 170 degrees. Having dihedral angle 114 greater than 70 degrees ensures that shaped abrasive particle 100 is not a regular tetrahedron.

The value of dihedral angle 114 can be selected for the intended purpose of shaped abrasive particle 100. For example, if dihedral angle 114 is equal to or greater than 90 degrees, abrasive particle 100 may be well suited to remove material from a workpiece, achieve a deep cut in the workpiece, or remove a large piece of material from the workpiece. Conversely, if dihedral angle 114 is less than 90 degrees, shaped abrasive particle 100 may still have some of the characteristics previously described, but may additionally be better suited for finishing a surface of the workpiece. Selection of a specific value for dihedral angle 114 can depend on factors such as the material of the workpiece, the pressure at which the abrasive particle is applied to the workpiece, and the speed of an abrasive article to which the abrasive particle is attached. The performance can also be affected by the relative spacing between shaped abrasive particles 100.

In some embodiments, a second dihedral angle 116 measured between two faces other than first rake face 102A and second rake face 102B can also be in a range of from about of from about 71 degrees to about 170 degrees. For example, second dihedral angle 116 measured between third face 102C and fourth rake face 102D, can be in a range of from about 71 degrees to about 170 degrees, about 80 degrees to about 135 degrees, about 85 degrees to about 95 degrees, less than, equal to, or greater than about 71 degrees, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 161, 162, 163, 164, 165, 166, 167, 168, 169, or about 170 degrees. In some embodiments, dihedral angle 114 between first rake face 102A and second face 102B is substantially the same as second dihedral angle 116. In still further embodiments, dihedral angle 114 between the first rake face 102A and the second face 102B is different than second dihedral angle 116 between the at least two faces other than the first rake face 102A and the second rake face 102B. In some embodiments, in addition to dihedral angles 114 and dihedral angle 116 being substantially the same, the dimensions of each of major faces 102 can be substantially the same by at least one of surface area, a largest dimension, and a largest width dimension. The ability to have dihedral angles 114 and 116 be substantially equivalent, and optionally to have the dimensions of all major faces 102 be the same, can allow shaped abrasive particle 100 to "self-orient" on a backing of an abrasive article, such that no matter which of major faces 102 are in contact with the backing, a rake angle between one of major faces 102 and the backing is between about 10 degrees to about 170 degrees.

As shown in FIGS. 1A-1D, each of major faces 102 are the same in size by at least one of surface area, a largest length dimension, and a largest width dimension. However, in some further embodiments, it may be possible to have at least one of major faces 102 differ in size from at least one other major face 102.

As shown in FIGS. 1A-1D, each major face 102 is planar, but in further embodiments, it may be possible for any of major faces 102 to be substantially non-planar. For example, a non-planar major face 102 can have a concave or convex profile. Whether major face 102 is planar or non-planar, shaped abrasive particle 100, can include a shape feature. The shape feature can be located on any one of major faces 102 or edges 104. The shape feature can be chosen from an opening, a concave surface, a convex surface, a groove, a ridge, a fractured surface, a low roundness factor, or a perimeter comprising one or more corner points having a sharp tip.

Shaped abrasive particle 100 can be formed from many suitable materials or combinations of materials. For example, shaped abrasive particle 100 can comprise a ceramic material or a polymeric material. If shaped abrasive particle 100 comprises a ceramic material, the ceramic material can include alpha alumina, sol-gel derived alpha alumina, or a mixture thereof. Other suitable materials include a fused aluminum oxide, a heat-treated aluminum oxide, a ceramic aluminum oxide, a sintered aluminum oxide, a silicon carbide material, a titanium diboride, a boron carbide, a tungsten carbide, a titanium carbide, a diamond, a cubic boron nitride, a garnet, a fused alumina-zirconia, a cerium oxide, a zirconium oxide, a titanium oxide or a combination thereof.

Shaped abrasive particles 100 that include a polymeric material can be characterized as soft abrasive particles. The soft shaped abrasive particles described herein can include any suitable material or combination of materials. For example, the soft shaped abrasive particles can include a reaction product of a polymerizable mixture including one or more polymerizable resins. The one or more polymerizable resins are chosen from a phenolic resin, a urea form-aldehyde resin, a urethane resin, a melamine resin, an epoxy resin, a bismaleimide resin, a vinyl ether resin, an amino-plast resin (which may include pendant alpha, beta unsaturated carbonyl groups), an acrylate resin, an acrylated iso-cyanurate resin, an isocyanurate resin, an acrylated urethane resin, an acrylated epoxy resin, an alkyl resin, a polyester resin, a drying oil, or mixtures thereof. The polymerizable mixture can include additional components such as a plasticizer, an acid catalyst, a cross-linker, a surfactant, a mild-abrasive, a pigment, a catalyst and an antibacterial agent.

Where multiple components are present in the polymerizable mixture, those components can account for any suitable weight percentage of the mixture. For example, the polymerizable resin or resins, may be in a range of from about 35 wt % to about 99.9 wt % of the polymerizable mixture, about 40 wt % to about 95 wt %, or less than, equal to, or greater than about 35 wt %, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or about 99.9 wt %.

If present, the cross-linker may be in a range of from about 2 wt % to about 60 wt % of the polymerizable mixture, from about 5 wt % to about 10 wt %, or less than, equal to, or greater than about 2 wt %, 3, 4, 5, 6, 7, 8, 9, 10, 11, 12, 13, 14, or about 15 wt %. Examples of suitable cross-linkers include a cross-linker available under the trade designation CYMEL 303 LF, of Allnex USA Inc., Alpharetta, Georgia, USA; or a cross-linker available under the trade designation CYMEL 385, of Allnex USA Inc., Alpharetta, Georgia, USA.

If present, the mild-abrasive may be in a range of from about 5 wt % to about 65 wt % of the polymerizable mixture, about 10 wt % to about 20 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 wt %. Examples of suitable mild-abrasives include a mild-abrasive available under the trade designation MINSTRON 353 TALC, of Imerys Talc America, Inc., Three Forks, Montana, USA; a mild-abrasive available under the trade designation USG TERRA ALBA NO.1 CALCIUM SULFATE, of USG Corporation, Chicago, Illinois, USA; Recycled Glass (40-70 Grit) available from ESCA Industries, Ltd., Hatfield, Pennsylvania, USA, silica, calcite, nepheline, syenite, calcium carbonate, or mixtures thereof.

If present, the plasticizer may be in a range of from about 5 wt % to about 40 wt % of the polymerizable mixture, about 10 wt % to about 15 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %. Examples of suitable plasticizers include acrylic resins or styrene buta-diene resins. Examples of acrylic resins include an acrylic resin available under the trade designation RHOPLEX GL-618, of DOW Chemical Company, Midland, Michigan, USA; an acrylic resin available under the trade designation HYCAR 2679, of the Lubrizol Corporation, Wickliffe, Ohio, USA; an acrylic resin available under the trade designation HYCAR 26796, of the Lubrizol Corporation, Wickliffe, Ohio, USA; a polyether polyol available under the trade designation ARCOL LG-650, of DOW Chemical Company, Midland, Michigan, USA; or an acrylic resin available under the trade designation HYCAR 26315, of the Lubrizol Corporation, Wickliffe, Ohio, USA. An example of a styrene butadiene resin includes a resin available under the trade designation ROVENE 5900, of Mallard Creek Polymers, Inc., Charlotte, North Carolina, USA.

If present, the acid catalyst may be in a range of from 1 wt % to about 20 wt % of the polymerizable mixture, about 5 wt % to about 10 wt %, or less than, equal to, or greater than about 1 wt %, 2, 3, 4, 5, 6, 7, 8, 9, 10, 11, 12, 13, 14, 15, 16, 17, 18, 19, or about 20 wt %. Examples of suitable acid catalysts include a solution of aluminum chloride or a solution of ammonium chloride.

If present, the surfactant can be in a range of from about 0.001 wt % to about 15 wt % of the polymerizable mixture about 5 wt % to about 10 wt %, less than, equal to, or greater than about 0.001 wt %, 0.01, 0.5, 1, 2, 3, 4, 5, 6, 7, 8, 9, 10, 11, 12, 13, 14, or about 15 wt %. Examples of suitable surfactants include a surfactant available under the trade designation GEMTEX SC-85-P, of Innospec Performance Chemicals, Salisbury, North Carolina, USA; a surfactant available under the trade designation DYNOL 604, of Air Products and Chemicals, Inc., Allentown, Pennsylvania, USA; a surfactant available under the trade designation ACRYSOL RM-8W, of DOW Chemical Company, Midland, Michigan, USA; or a surfactant available under the trade designation XIAMETER AFE 1520, of DOW Chemical Company, Midland, Michigan, USA.

If present, the antimicrobial agent may be in a range of from 0.5 wt % to about 20 wt % of the polymerizable mixture, about 10 wt % to about 15 wt %, or less than, equal to, or greater than about 0.5 wt %, 1, 2, 3, 4, 5, 6, 7, 8, 9, 10, 11, 12, 13, 14, 15, 16, 17, 18, 19, or about 20 wt %. An example of a suitable antimicrobial agent includes zinc pyrithione.

If present, the pigment may be in a range of from about 0.1 wt % to about 10 wt % of the polymerizable mixture, about 3 wt % to about 5 wt %, less than, equal to, or greater than about 0.1 wt %, 0.2, 0.4, 0.6, 0.8, 1, 1.5, 2, 2.5, 3, 3.5, 4, 4.5, 5, 5.5, 6, 6.5, 7, 7.5, 8, 8.5, 9, 9.5, or about 10 wt %. Examples of suitable pigments include a pigment dispersion available under the trade designation SUNSPERSE BLUE 15, of Sun Chemical Corporation, Parsippany, New Jersey, USA; a pigment dispersion available under the trade designation SUNSPERSE VIOLET 23, of Sun Chemical Corporation, Parsippany, New Jersey, USA; a pigment dispersion available under the trade designation SUN BLACK, of Sun Chemical Corporation, Parsippany, New Jersey, USA; or a pigment dispersion available under the trade designation BLUE PIGMENT B2G, of Clariant Ltd., Charlotte, North Carolina, USA.

In addition to the materials already described, at least one magnetic material may be included within or coated to shaped abrasive particle 100. Examples of magnetic materials include iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); $MnSb$; $MnOFe_2O_3$; $Y_3Fe_5O_{12}$; $CrO_2$; $MnAs$; ferrites such as ferrite, magnetite, zinc ferrite; nickel ferrite; cobalt ferrite, magnesium ferrite, barium ferrite, and strontium ferrite; yttrium iron garnet; and combinations of the foregoing. In some embodiments, the magnetizable material is an alloy containing 8 to 12 weight percent aluminum, 15 to 26 wt % nickel, 5 to 24 wt % cobalt, up to 6 wt % copper, up to 1% titanium, wherein the balance of material to add up to 100 wt % is iron. In some other embodiments, a magnetizable coating can be deposited on an abrasive particle 100 using a vapor deposition technique such as, for example, physical vapor deposition (PVD) including magnetron sputtering.

Including these magnetizable materials can allow shaped abrasive particle 100 to be responsive a magnetic field. Any of shaped abrasive particles 100 can include the same material or include different materials.

Shaped abrasive particle 100 is a monolithic abrasive particle. As shown, shaped abrasive particle 100 is free of a binder and is not an agglomeration of abrasive particles held together by a binder or other adhesive material.

Shaped abrasive particle 100 can be formed in many suitable manners for example, the shaped abrasive particle 100 can be made according to a multi-operation process. The process can be carried out using any material or precursor dispersion material. Briefly, for embodiments where shaped abrasive particles 100 are monolithic ceramic particles, the process can include the operations of making either a seeded or non-seeded precursor dispersion that can be converted into a corresponding (e.g., a boehmite sol-gel that can be converted to alpha alumina); filling one or more mold cavities having the desired outer shape of shaped abrasive particle 100 with a precursor dispersion; drying the precursor dispersion to form precursor shaped abrasive particle; removing the precursor shaped abrasive particle 100 from the mold cavities; calcining the precursor shaped abrasive particle 100 to form calcined, precursor shaped abrasive particle 100; and then sintering the calcined, precursor shaped abrasive particle 100 to form shaped abrasive particle 100. The process will now be described in greater detail in the context of alpha-alumina-containing shaped abrasive particle 100. In other embodiments, the mold cavities may be filled with a melamine to form melamine shaped abrasive particles.

The process can include the operation of providing either a seeded or non-seeded dispersion of a precursor that can be converted into ceramic. In examples where the precursor is seeded, the precursor can be seeded with an oxide of an iron (e.g., FeO). The precursor dispersion can include a liquid that is a volatile component. In one example, the volatile component is water. The dispersion can include a sufficient amount of liquid for the viscosity of the dispersion to be sufficiently low to allow filling mold cavities and replicating the mold surfaces, but not so much liquid as to cause subsequent removal of the liquid from the mold cavity to be prohibitively expensive. In one example, the precursor dispersion includes from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight, of the volatile component such as water. Conversely, the precursor dispersion in some embodiments contains from 30 percent to 50 percent, or 40 percent to 50 percent solids by weight.

Examples of suitable precursor dispersions include zirconium oxide sols, vanadium oxide sols, cerium oxide sols, aluminum oxide sols, and combinations thereof. Suitable aluminum oxide dispersions include, for example, boehmite dispersions and other aluminum oxide hydrates dispersions. Boehmite can be prepared by known techniques or can be obtained commercially. Examples of commercially available boehmite include products having the trade designations "DISPERAL" and "DISPAL", both available from Sasol North America, Inc., or "HIQ-40" available from BASF Corporation. These aluminum oxide monohydrates are relatively pure; that is, they include relatively little, if any, hydrate phases other than monohydrates, and have a high surface area.

The physical properties of the resulting shaped abrasive particle 100 can generally depend upon the type of material used in the precursor dispersion. As used herein, a "gel" is a three-dimensional network of solids dispersed in a liquid.

The precursor dispersion can contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, such as water-soluble salts. They can include a metal-containing compound and can be a precursor of an oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the precursor dispersion can be varied.

The introduction of a modifying additive or precursor of a modifying additive can cause the precursor dispersion to gel. The precursor dispersion can also be induced to gel by application of heat over a period of time to reduce the liquid content in the dispersion through evaporation. The precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the precursor dispersion to produce a more stable hydrosol or colloidal precursor dispersion. Suitable peptizing agents are monoprotic acids or acid compounds such as acetic acid, hydrochloric acid, formic acid, and nitric acid. Multiprotic acids can also be used, but they can rapidly gel the precursor dispersion, making it difficult to handle or to introduce additional components. Some commercial sources of boehmite contain an acid titer (such as absorbed formic or nitric acid) that will assist in forming a stable precursor dispersion.

The precursor dispersion can be formed by any suitable means; for example, in the case of a sol-gel alumina precursor, it can be formed by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

A further operation can include providing a mold having at least one mold cavity, or a plurality of cavities formed in at least one major surface of the mold. In some examples, the mold is formed as a production tool, which can be, for example, a belt, a sheet, a continuous web, a coating roll such as a rotogravure roll, a sleeve mounted on a coating roll, or a die. In one example, the production tool can include polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one example, the entire tooling is made from a polymeric or thermoplastic material. In another example, the surfaces of the tooling in contact with the precursor dispersion while the precursor dispersion is drying, such as the surfaces of the plurality of cavities, include polymeric or thermoplastic materials, and other portions of the tooling can be made from other materials. A suitable polymeric coating can be applied to a metal tooling to change its surface tension properties, by way of example.

A polymeric or thermoplastic production tool can be replicated off a metal master tool. The master tool can have the inverse pattern of that desired for the production tool. The master tool can be made in the same manner as the production tool. In one example, the master tool is made out of metal (e.g., nickel) and is diamond-turned. In one example, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that can distort the thermoplastic production tool, limiting its life.

Access to cavities can be from an opening in the top surface or bottom surface of the mold. In some examples, the cavities can extend for the entire thickness of the mold. Alternatively, the cavities can extend only for a portion of the thickness of the mold. In one example, the top surface is substantially parallel to the bottom surface of the mold with the cavities having a substantially uniform depth. At least one side of the mold, the side in which the cavities are formed, can remain exposed to the surrounding atmosphere during the step in which the volatile component is removed.

The cavities have a specified three-dimensional shape to make shaped abrasive particle 100. The depth dimension is equal to the perpendicular distance from the top surface to the lowermost point on the bottom surface. The depth of a given cavity can be uniform or can vary along its length and/or width. The cavities of a given mold can be of the same shape or of different shapes.

A further operation involves filling the cavities in the mold with the precursor dispersion (e.g., by a conventional technique). In some examples, a knife roll coater or vacuum slot die coater can be used. A mold release agent can be used to aid in removing the particles from the mold if desired. Examples of mold release agents include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the precursor dispersion such that from about 0.1 $mg/in^2$ (0.6 $mg/cm^2$) to about 3.0 $mg/in^2$ (20 $mg/cm^2$), or from about 0.1 $mg/in^2$ (0.6 $mg/cm^2$) to about 5.0 $mg/in^2$ (30 $mg/cm^2$), of the mold release agent is present per unit area of the mold when a mold release is desired. In some embodiments, the top surface of the mold is coated with the precursor dispersion. The precursor dispersion can be pumped onto the top surface.

In a further operation, a scraper or leveler bar can be used to force the precursor dispersion fully into the cavity of the mold. The remaining portion of the precursor dispersion that does not enter the cavity can be removed from the top surface of the mold and recycled. In some examples, a small portion of the precursor dispersion can remain on the top surface, and in other examples the top surface is substantially free of the dispersion. The pressure applied by the scraper or leveler bar can be less than 100 psi (0.6 MPa), or less than 50 psi (0.3 MPa), or even less than 10 psi (60 kPa). In some examples, no exposed surface of the precursor dispersion extends substantially beyond the top surface.

In those examples where it is desired to have the exposed surfaces of the cavities result in planar faces of the shaped abrasive particles, it can be desirable to overfill the cavities (e.g., using a micronozzle array) and slowly dry the precursor dispersion.

A further operation involves removing the volatile component to dry the dispersion. The volatile component can be removed by fast evaporation rates. In some examples, removal of the volatile component by evaporation occurs at temperatures above the boiling point of the volatile component. An upper limit to the drying temperature often depends on the material the mold is made from. For polypropylene tooling, the temperature should be less than the melting point of the plastic. In one example, for a water dispersion of from about 40 to 50 percent solids and a polypropylene mold, the drying temperatures can be from about 90° C. to about 165° C., or from about 105° C. to about 150° C., or from about 105° C. to about 120° C. Higher temperatures can lead to improved production speeds but can also lead to degradation of the polypropylene tooling, limiting its useful life as a mold.

During drying, the precursor dispersion shrinks, often causing retraction from the cavity walls. For example, if the cavities have planar walls, then the resulting shaped abrasive particle 100 can tend to have at least three concave major sides. It is presently discovered that by making the cavity walls concave (whereby the cavity volume is increased) it is possible to obtain shaped abrasive particle 100 that have at least three substantially planar major sides. The degree of concavity generally depends on the solids content of the precursor dispersion.

A further operation involves removing resultant precursor shaped abrasive particle 100 from the mold cavities. The precursor shaped abrasive particle 100 can be removed from the cavities by using the following processes alone or in combination on the mold: gravity, vibration, ultrasonic vibration, vacuum, or pressurized air to remove the particles from the mold cavities.

The precursor shaped abrasive particle 100 can be further dried outside of the mold. If the precursor dispersion is dried to the desired level in the mold, this additional drying step is not necessary. However, in some instances it can be economical to employ this additional drying step to minimize the time that the precursor dispersion resides in the mold. The precursor shaped abrasive particle 100 will be dried from 10 to 480 minutes, or from 120 to 400 minutes, at a temperature from 50° C. to 160° C., or 120° C. to 150° C.

A further operation involves calcining the precursor shaped abrasive particle 100. During calcining, essentially all the volatile material is removed, and the various components that were present in the precursor dispersion are transformed into metal oxides. The precursor shaped abrasive particle 100 are generally heated to a temperature from 400° C. to 800° C. and maintained within this temperature range until the free water and over 90 percent by weight of any bound volatile material are removed. In an optional step, it can be desirable to introduce the modifying additive by an impregnation process. A water-soluble salt can be introduced by impregnation into the pores of the calcined, precursor shaped abrasive particle 100. Then the precursor shaped abrasive particle 100 are pre-fired again.

A further operation can involve sintering the calcined, precursor shaped abrasive particle 100 to form particles 100. In some examples where the precursor includes rare earth metals, however, sintering may not be necessary. Prior to sintering, the calcined, precursor shaped abrasive particle 100 are not completely densified and thus lack the desired hardness to be used as shaped abrasive particle 100. Sintering takes place by heating the calcined, precursor shaped abrasive particle 100 to a temperature of from 1000° C. to 1650° C. The length of time for which the calcined, precursor shaped abrasive particle 100 can be exposed to the sintering temperature to achieve this level of conversion depends upon various factors, but from five seconds to 48 hours is possible.

In another embodiment, the duration of the sintering step ranges from one minute to 90 minutes. After sintering, the shaped abrasive particle 14 can have a Vickers hardness of 10 GPa (gigaPascals), 16 GPa, 18 GPa, 20 GPa, or greater.

Additional operations can be used to modify the described process, such as, for example, rapidly heating the material from the calcining temperature to the sintering temperature, and centrifuging the precursor dispersion to remove sludge and/or waste. Moreover, the process can be modified by combining two or more of the process steps if desired.

To form soft shaped abrasive particle 100 the polymerizable mixtures described herein can be deposited in a cavity. The cavity can have a shape corresponding to the negative impression of the desired shaped abrasive particle 100. After the cavity is filled to the desired degree, the polymerizable mixture is cured therein. Curing can occur at room temperature (e.g., about 25° C.) or at any temperature above room temperature. Curing can also be accomplished by exposing the polymerizable mixture to a source of electromagnetic radiation or ultraviolet radiation.

Shaped abrasive particles 100 can be independently sized according to an abrasives industry recognized specified nominal grade. Abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F18, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JI58, JI512, JI516, JI524, JI536, JI546, JI554, JI560, JI580, JIS100, JIS150, JIS180, J15220, J15240, J15280, J15320, J15360, J15400, J15600, 115800, JIS1000, JIS1500, J152500, 1154000, 1156000, 1158000, and JIS10,000.

Figure 2B:
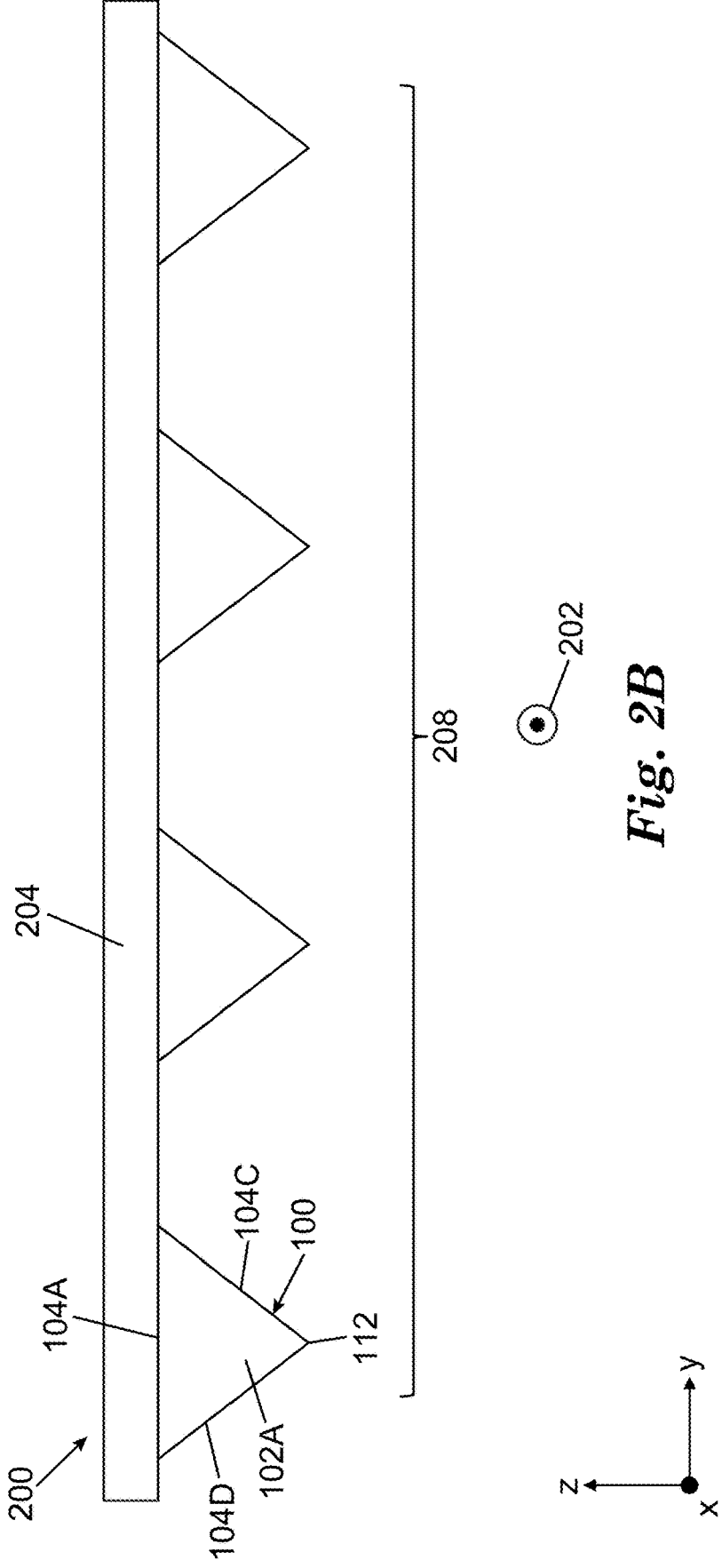
FIG. 2B is a front view of the abrasive belt, in accordance with various embodiments.
Figure 2C:
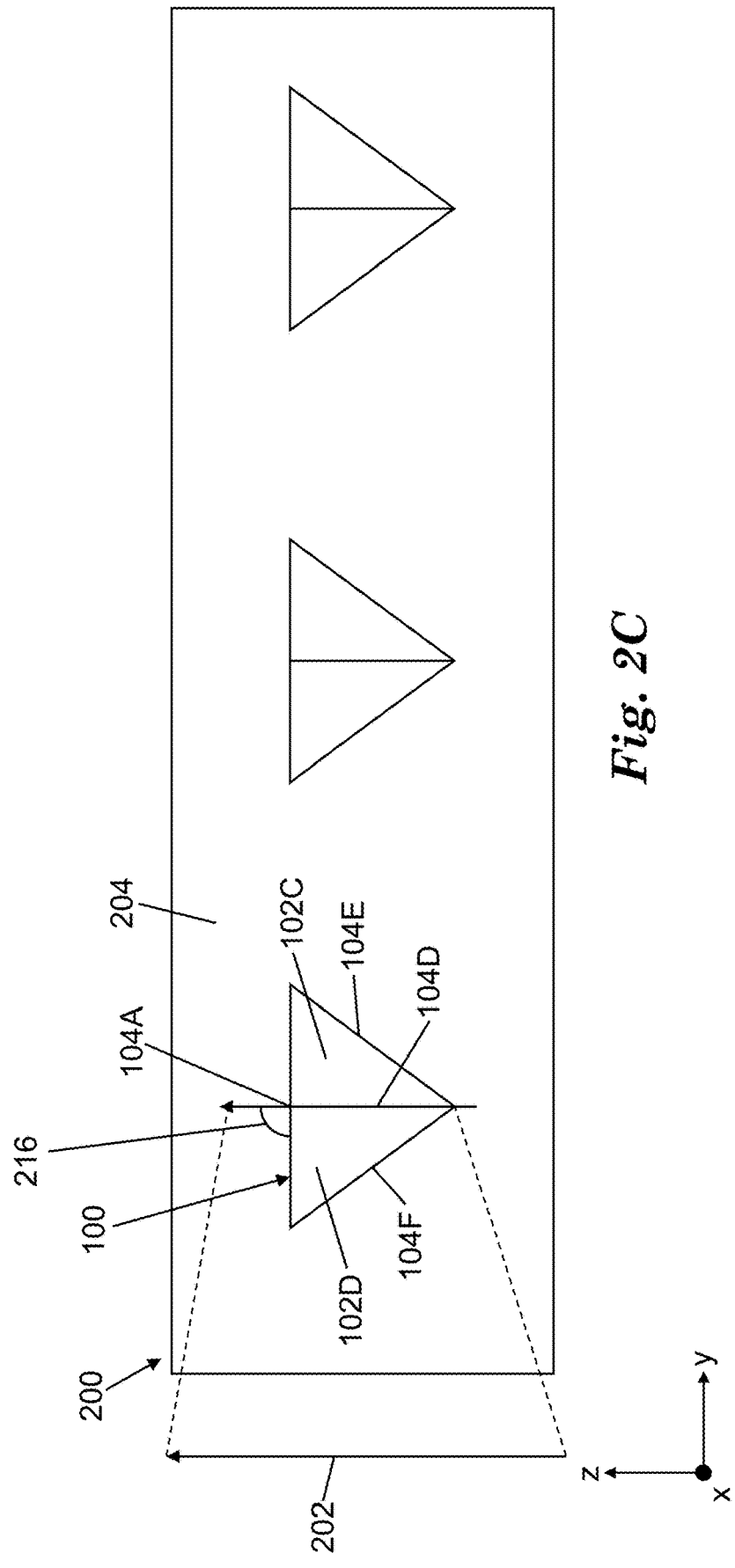
FIG. 2C is a bottom view of the abrasive belt, in accordance with various embodiments.

According to various embodiments of the present disclosure, an abrasive article is disclosed. The abrasive article can be chosen from many different abrasive articles such as an abrasive belt, an abrasive sheet or an abrasive disc. FIGS. 2A-2C are various views of abrasive belt 200. FIG. 2A is a side view of belt 200, FIG. 2B is a front view of belt 200, and FIG. 2C is a bottom view of belt 200. FIGS. 2A-2C show many of the same features and will be discussed concurrently. As shown in FIGS. 2A-2C, abrasive belt 200 has a z-axis and a y-axis orthogonal to the z-axis. Direction of use 202 for abrasive belt 10 extends in one direction along an x-axis orthogonal to both the z-axis and the y-axis. Relative to FIG. 2A, direction of use 202 is from left to right; relative to FIG. 2B, direction of use 202 is out of the figure towards the reader; relative to FIG. 2C, direction of use 202 is from the bottom of the figure to the top of the figure. Running the belt in direction of use 202 can be suitable for removing material form a workpiece. However, running the belt in a direction opposite (e.g., 180 degrees) from direction of use 202, can be useful to finish a surface of the workpiece, according to various embodiments. Abrasive belt 200 includes backing 204 having shaped abrasive particles 100 attached thereto. As shown, an edge 104 or major face 102 of least one shaped abrasive particle 100 is substantially in contact with backing 204. In additional embodiments, it may be possible for one of edges 104 or portions of one of edges 104 to be free of contact with backing 204. In additional embodiments, it may also be possible for one of major faces 102, or a portion of one of major faces 102, to be free of contact with backing 204.

Backing 204 can have any desirable degree of flexibility. Backing 204 can include any suitable material. For example, backing 204 can include a polymeric film, a metal foil, a woven fabric, a knitted fabric, paper, a vulcanized fiber, a nonwoven, a foam, a screen, a laminate, or combinations thereof. Backing 204 can further include various additive(s). Examples of suitable additives include colorants, processing aids, reinforcing fibers, heat stabilizers, UV stabilizers, and antioxidants. Examples of useful fillers include clays, calcium carbonate, glass beads, talc, clays, mica, wood flour; and carbon black.

Shaped abrasive particle 100 can be positioned relative to backing 204 to achieve several performance characteristics of abrasive belt 200. The positioning of shaped abrasive particle 100 can be characterized by a variety of different angles of shaped abrasive particle 100, relative to backing 204.

For example, rake angle 206 can be characterized by an angle measured between backing 204 and first rake face 102A or vertex 112. As shown in FIG. 1A, rake angle 206 is about 90 degrees. However, in other embodiments, rake angle 206 can be chosen from a value in a range of from about 10 degrees to about 170 degrees, about 80 degrees to about 100 degrees, about 85 degrees to about 95 degrees, or less than, equal to, or greater than about 10 degrees, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, or about 170 degrees. The value of rake angle 206 can be selected for the intended purpose of abrasive belt 200. For example, if rake angle 206 is equal to or less than 90 degrees, the abrasive article may be well suited to remove material from a workpiece, achieve a deep cut in the workpiece, or remove a large piece of swarf from the workpiece. According to some embodiments, these rake angle values can be useful for abrading "softer" materials such as aluminum or wood. Conversely, if rake angle 206 is greater than 90 degrees, abrasive belt 200 may still have some of the characteristics previously described, but may additionally be better suited for finishing a surface of the workpiece. According to some embodiments, these rake angle values can be useful for abrading "harder" materials such as steel or Inconel In some embodiments of abrasive belt 200, it may be desirable for a certain percentage of shaped abrasive particles 100 to have substantially the same rake angle 206. For example, in some embodiments, rake angle 206 of about 50% to about 100% of the shaped abrasive particles is substantially the same, or about 90% to about 100%, or less than, equal to, or greater than about 50%, 55, 60, 65, 70, 75, 80, 85, 90, 95, or 100%. Having 100% of abrasive particles 100 of abrasive belt 200 sharing the same rake angle 206 can be desirable in achieving consistent performance in abrasive belt 200. However, in some embodiments of abrasive belt 200, it may be desirable to have different rake angles. For example, some embodiments of abrasive belt 200 may include a plurality of rows abrasive particles 100. With respect to FIG. 2A, three rows 208, 210, and 212 are shown, although other embodiments of abrasive belt 200 can include fewer or more rows. As shown, each of rows 208, 210, or 212 extends in the y-direction and adjacent rows (e.g., 208 and 210 as well as 210 and 212) are spaced relative to each other in the x-direction. Although the spacing in the x-direction is shown as consistent between adjacent shaped abrasive particles 100, the spacing can also be random. Additionally, the spacing between adjacent shaped abrasive particles in the y-direction can be consistent or random. In embodiments including multiple rows, it is possible for each abrasive particle 100 in a row to have the same rake angle 206. For example, each of shaped abrasive particles 100 of row 208 can have the same rake angle 206. Further, each of shaped abrasive particles 100 of row 210 can have the same rake angle 206, but this rake angle 206 can be different from that of shaped abrasive particles 100 of row 208. Further, each of shaped abrasive particles 100 of row 212 can have the same rake angle 206, but this rake angle 206 can be different from that of shaped abrasive particles 100 of rows 208 and 210. In this manner a gradient of rake angles 206 can be created in abrasive belt 200.

A relief angle 214 is characterized by an angle measured between backing 204 and vertex 112 at the inflection point of edge. As shown in FIG. 2A, relief angle 214 is measured between backing 204 and vertex 112 along edge 104D. In various embodiments, relief angle 214 can be in a range of from about 90 degrees to about 180 degrees, about 120 degrees to about 140 degrees, or less than, equal to, or greater than about 90 degrees, 95, 100, 105, 110, 115, 120, 125, 130, 135, 140, 145, 150, 155, 160, 165, 170, 175, or about 180 degrees. In some embodiments the difference between rake angle 206 and relief angle 214 may be in a range of from about 5 degrees to about 50 degrees, about 10 degrees to about 40 degrees, or less than, equal to, or greater than about 5 degrees, 10, 15, 20, 25, 30, 35, 40, 45, or about 50 degrees. The value of relief angle 214 can be selected for the intended purpose of abrasive belt 200. For example, as relief angle 214 approaches higher values abrasive belt 200 may be able to finish a surface (e.g., if direction of use 202 is reversed to a second direction of use) Additionally, if relief angle 214 is a higher value, it may be possible for material removed from a workpiece to be ejected, thus helping to prevent clogging of abrasive belt 200. However, in some embodiments, having a lower value for relief angle 214 can help to strengthen the attachment of abrasive particle 100 to backing as force is applied to abrasive belt 200 during operation.

In some embodiments of abrasive belt 200, it may be desirable for a certain percentage of shaped abrasive particles 100 to have substantially the same relief angle 214. For example, in some embodiments, relief angle 214 of about 50% to about 100% of the shaped abrasive particles is substantially the same, or about 90% to about 100%, or less than, equal to, or greater than about 50%, 55, 60, 65, 70, 75, 80, 85, 90, 95, or 100%. Having 100% of abrasive particles 100 of abrasive belt 200 sharing the same relief angle 214 can be desirable in achieving consistent performance in abrasive belt 200. However, in some embodiments of abrasive belt 200, it may be desirable to have different relief angles 214. For example, each of shaped abrasive particles 100 of row 208 can have the same relief angle 214. Further, each of shaped abrasive particles 100 of row 210 can have the same relief angle 214, but this relief angle 214 is different from that of shaped abrasive particles 100 of row 208. Further, each of shaped abrasive particles 100 of row 212 can have the same relief angle 214, but this relief angle 214 is different from that of shaped abrasive particles 100 of rows 208 and 210. In this manner a gradient of relief angles 214 can be created in abrasive belt 200.

A further angle to characterize shaped abrasive particles 100 can be z-direction rotational angle 216. As shown in FIG. 2C, z-direction rotational angle 216 can be defined between first edge 104A and direction of use 202. Z-direction rotational angle 216 can be in a range of from about 10 degrees to about 170 degrees, about 80 degrees and about 100 degrees, about 85 degrees and about 95 degrees, or less than, equal to, or greater than about 10 degrees, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, or about 170 degrees.

In some embodiments of abrasive belt 200, it may be desirable for a certain percentage of shaped abrasive particles 100 to have substantially the same z-direction rotational angle 216. For example, in some embodiments, z-direction rotational angle 216 of about 50% to about 100% of the shaped abrasive particles is substantially the same, or about 90% to about 100%, or less than, equal to, or greater than about 50%, 55, 60, 65, 70, 75, 80, 85, 90, 95, or 100%. Having 100% of abrasive particles 100 of abrasive belt 200 sharing the same z-direction rotational angle 216 can be desirable in achieving consistent performance in abrasive belt 200. However, in some embodiments of abrasive belt 200, it may be desirable to have different z-direction rotational angles 216. For example, each of shaped abrasive particles 100 of row 208 can have the same z-direction rotational angle 216. Further, each of shaped abrasive particles 100 of row 210 can have the same z-direction rotational angle 216, but this z-direction rotational angle 216 is different from that of shaped abrasive particles 100 of row 208. Further, each of shaped abrasive particles 100 of row 212 can have the same z-direction rotational angle 216, but this z-direction rotational angle 216 different from that of shaped abrasive particles 100 of rows 208 and 210. In this manner a gradient of z-direction rotational angles 216 can be created in abrasive belt 200. Alternatively, z-direction rotational angle 216 of adjacent shaped abrasive particles 100 within the same row can be different to create a gradient in the y-direction.

Figure 3:
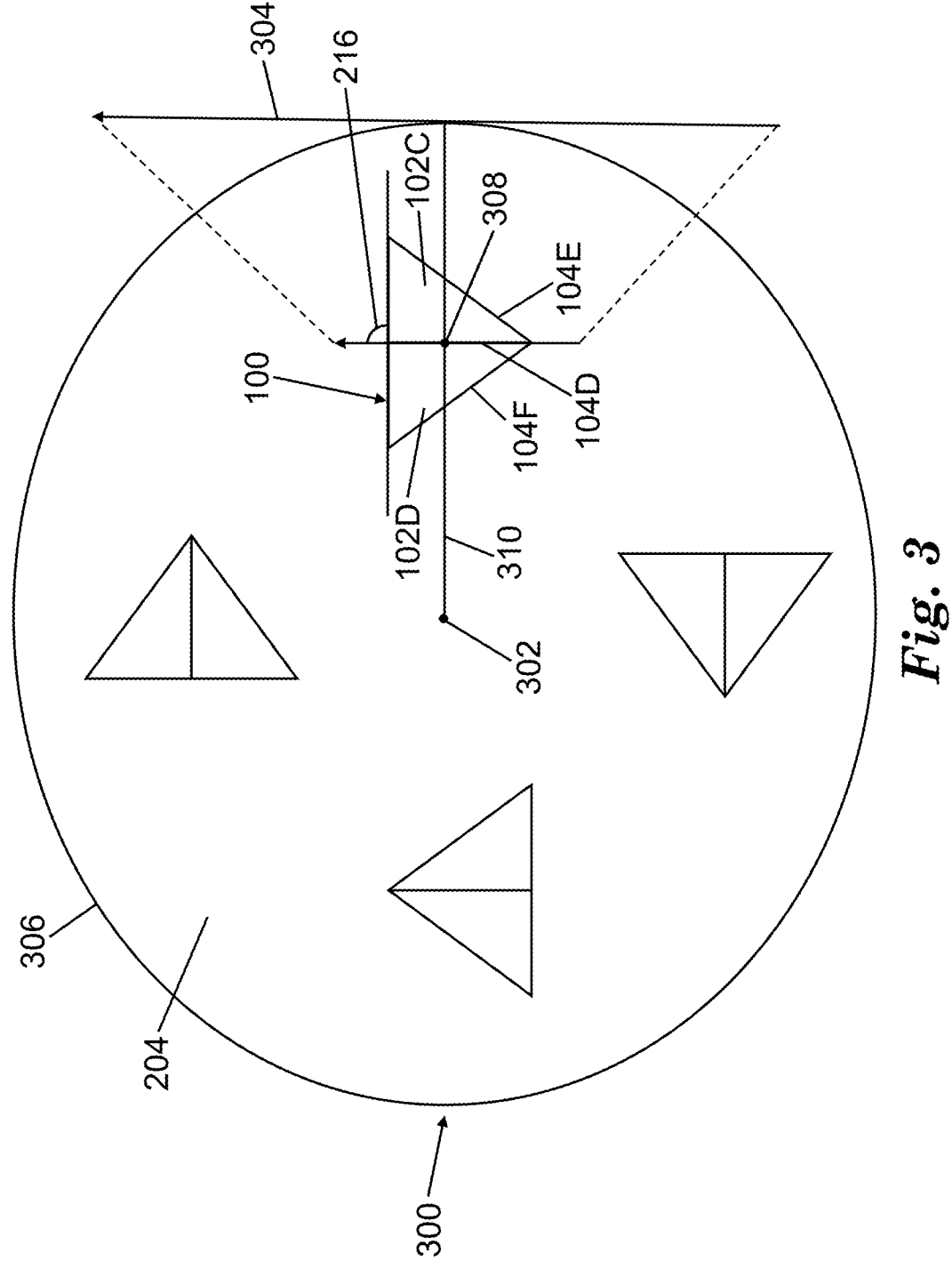
FIG. 3 is a bottom view of an abrasive disc, in accordance with various embodiments.

FIGS. 2A-2C show embodiments in which shaped abrasive particle 100 is an abrasive belt or an abrasive sheet adapted for linear movement. In other embodiments, however, the abrasive article can be an abrasive disc that is adapted for rotational movement. FIG. 3 is a bottom view of abrasive disc 300. Abrasive disc 300 is adapted for rotational movement about central axis 302. The tangential rotational direction of use 304, can be determined with a line tangent to outer perimeter 306 of abrasive disc 300.

In abrasive disc 300, shaped abrasive particles 100 can possess the same properties as those of abrasive belt 200. For example, shaped abrasive particles can have the same rake angle 206, relief angle 214, and z-direction rotational angle 216 properties described herein with respect to FIGS. 1A-1D and FIGS. 2A-2C. Each of rake angle 206 and relief angle 214 can be measured and determined in a manner consistent with those described above with respect to FIGS. 1A-1D and FIGS. 2A-2C. In order to measure z-direction rotational angle 216 of each shaped abrasive particle 100 in abrasive disc 300, center of mass 308 of an individual shaped abrasive particle 100 is determined. Line 310 is drawn from central axis 302 through center of mass 308 to outer perimeter 306. A line tangent to outer perimeter 306, representing direction of use 304, at the intersection between line 310 and outer perimeter 306 is imposed onto shaped abrasive particle 100 to pass through center of mass 308 and first rake face 102A. Z-direction rotational angle 216 is then measured between the superimposed tangent line 304 and line 310. While rake angle 206, relief angle 214, and z-direction rotational angle 216 for each shaped abrasive particle 100 is shown to be the same, in some embodiments, individual shaped abrasive particles 100 may have different values for rake angle 206, relief angle 214, and z-direction rotational angle 216. In some embodiments, a value for rake angle 206, relief angle 214, and z-direction rotational angle 216 for each shaped abrasive particle 100 can be within about 1 percent to about 20 percent of each other, about 5 percent to about 10 percent, less than, equal to, or greater than about 1 percent, 2, 3, 4, 5, 6, 7, 8, 9, 10, 11, 12, 13, 14, 15, 16, 17, 18, 19, or about 20 percent.

In some embodiments, shaped abrasive particles 100 can be included in a random orbital sander or vibratory sander. In these embodiments, it may be desirable to have shaped abrasive particles 100 be randomly oriented (e.g., have different or random z-direction rotational angles 216). This is because the direction of use of such an abrasive article is variable. Therefore, randomly orienting shaped abrasive particles 100 can help to expose one of rake faces 102A or 102B of suitable amount of shaped abrasive particles 100 to workpiece regardless of the specific direction of use of the random orbital sander or vibratory sander.

Shaped abrasive particles 100 can account for 100 wt % of the abrasive particles in any abrasive article. Alternatively, shaped abrasive particles 100 can be part of a blend of abrasive particles distributed on backing 204. If present as part of a blend, shaped abrasive particles 100 may be in a range of from about 5 wt % to about 95 wt % of the blend, about 10 wt % to about 80 wt %, about 30 wt % to about 50 wt %, or less than, equal to, or greater than about, 5 wt %, 10, 15, 20, 25, 30, 35, 40, 45, 50, 55, 60, 65, 70, 75, 80, 85, 90, or about 95 wt %, of the blend. In the blend, the balance of the abrasive particles may include conventional crushed abrasive particles. Crushed abrasive particles are generally formed through a mechanical crushing operation and have no replicated shape. The balance of the abrasive particles can also include other shaped abrasive particles, that may for example, include an equilateral triangular shape (e.g., a flat triangular shaped abrasive particle or a tetrahedral shaped abrasive particle in which each major face of the tetrahedron is an equilateral triangle).

Any abrasive article such as abrasive belt 200 or abrasive disc 300 can include a make coat to adhere shaped abrasive particles 100, or a blend of shaped abrasive particles 100 and crushed abrasive particles to backing 204. The abrasive article may further include a size coat adhering the shaped abrasive particles to the make coat. The make coat, size coat, or both can include any suitable resin such as a phenolic resin, an epoxy resin, a urea-formaldehyde resin, an acrylate resin, an aminoplast resin, a melamine resin, an acrylated epoxy resin, a urethane resin, or mixtures thereof. Additionally, the make coat, size coat, or both can include a filler, a grinding aid, a wetting agent, a surfactant, a dye, a pigment, a coupling agent, an adhesion promoter, or a mixture thereof. Examples of fillers may include calcium carbonate, silica, talc, clay, calcium metasilicate, dolomite, aluminum sulfate, or a mixture thereof.

The abrasive articles described herein can be manufactured according to any suitable method. Generally stated, the abrasive articles can be formed by orienting at least a portion of shaped abrasive particles 100 on backing 204 to achieve at least one of rake angle 206, z-direction rotational angle 216, relief angle 214, or a combination thereof. The method can further include adhering shaped abrasive particles 100 to backing 204.

Orienting shaped abrasive particles 100 can be accomplished, for example, by including one or more cavities in backing 204. The cavities can be shaped in such a manner that individual shaped abrasive particles 100 are positioned on backing 204 such that at least one of rake angle 206, z-direction rotational angle 216, relief angle 214, or a combination thereof achieve a predetermined value.

Including cavities in backing 204 can allow for shaped abrasive particles 100 to be drop coated or electrostatically coated to backing 204 while achieving the intended orientation. As generally understood, in a drop coating technique, a bulk supply of shaped abrasive particles 100 are fed through a hopper and fall onto backing 204 under the force of gravity and land in the cavities. Without the cavities, a spatial orientation of shaped abrasive particles 100 upon contacting the backing 204 would be entirely random in all directions. However, the cavities take away the random spatial orientations.

In other embodiments, precise orientation of shaped abrasive particles 100 can be accomplished using a distribution tool or a screen. The distribution tool or screen can include one or more slots defined by a plurality of walls. The slots can be open on two ends. One end can be configured to receive shaped abrasive particle 100 and the other end can be in contact with backing 204. Backing 204 can optionally have a make coat distributed thereon. The slots are designed such that individual shaped abrasive particles 100 are positioned on backing 204 such that at least one of rake angle 206, z-direction rotational angle 216, relief angle 214, or a combination thereof achieve a predetermined value. Particles that do not properly enter the cavities can be swept from the distribution tool and additional particles can be contacted with the distribution tool to enter the vacant slots.

The distribution tool including shaped abrasive particles 100 can be left in contact with backing 204 for any suitable amount of time as shaped abrasive particles 100 adhere to the make coat. After sufficient time has passed for good adhesion between shaped abrasive particles 100 and the make coat, the production tool is removed and a size coat is optionally disposed over shaped abrasive particles 100.

In other embodiments, precise orientation of shaped abrasive particles 100 can be achieved using a rotating production tool. The rotating production tool is circular and includes a plurality of cavities on an external surface. Each of the cavities are designed to receive shaped abrasive particles 100 in a particular orientation. In order to increase the probability that each cavity is filled, an excess of shaped abrasive particles 100 is contacted with production tool. Shaped abrasive particles 100 that do not enter the cavities are collected for later use. Once secured in the cavities, shaped abrasive particles 100 are contacted with backing 204, which can be supplied as a web. Backing 204 can have make coat pre-disposed thereon so that upon contact, shaped abrasive particles 100 adhere to backing 204 and are removed from the production tool.

In other embodiments, precise orientation of shaped abrasive particles 100 can be achieved using shaped abrasive particles that include at least some magnetic material. The shaped abrasive particles including at the magnetic material can be arranged randomly on backing 204. Shaped abrasive particles 100 can then be exposed to a magnetic field in such a manner that shaped abrasive particles 100 are rotated z-direction rotational angle 216. Once properly oriented, shaped abrasive particles 100 can be adhered to backing 204 with the make coat and optionally the size coat. As a result of this process, individual shaped abrasive particles 100 are positioned on backing 204 such that at least one of rake angle 206, z-direction rotational angle 216, relief angle 214, or a combination thereof achieve a predetermined value. An example of this process is described in further detail below with respect to FIGS. 4-7

Figure 4:
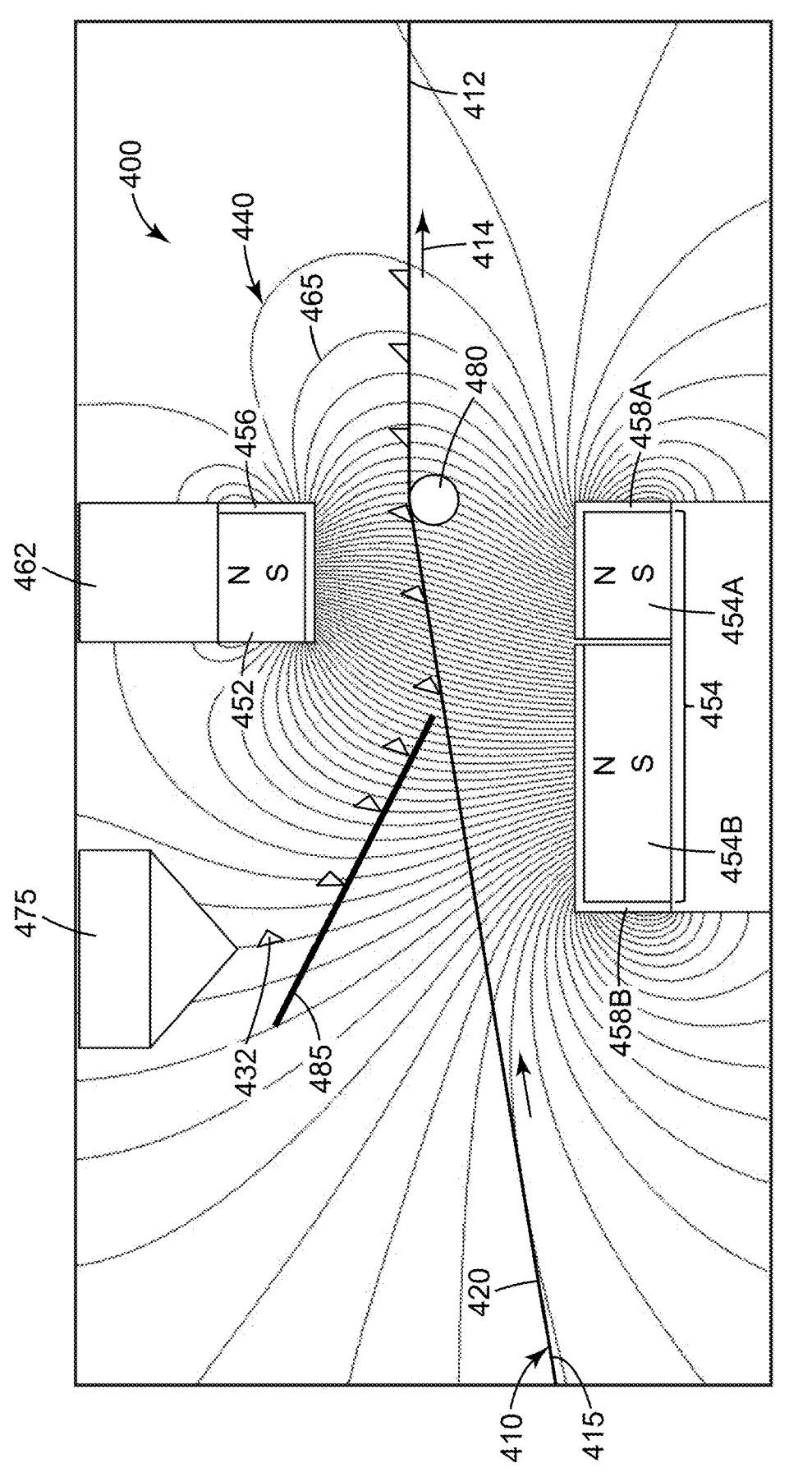
FIG. 4 is schematic diagram showing a method of making an abrasive article, in accordance with various embodiments.

FIG. 4 shows web 410 comprising backing 415 having make layer precursor 420 disposed thereon, which moves along web path 412 in a downweb direction 414 (e.g., machine direction). Web 410 has a crossweb direction (not shown) that is perpendicular to downweb direction 414. Make layer precursor 420 includes a first curable binder precursor (not shown). Magnetizable particles 432 (having a structure corresponding to shaped abrasive particles 100) are dropped through a portion of applied magnetic field 440 onto make layer precursor 420. At least some of magnetizable particles 432 are abrasive particles. Magnetizable particles 432 are predominantly deposited onto web 410 after travelling down downward sloping dispensing surface 485, which is fed from hopper 475. While travelling down downward sloping dispensing surface 485 the longest edge 104 of the magnetizable abrasive particles (e.g., 104A or 104D) tends to align with applied magnetic field 440. Various web handling components 480 (e.g., rollers, conveyor belts, feed rolls, and take up rolls) handle web 410.

Throughout the method, at least until transfer of the magnetizable abrasive particles to the make precursor layer, the magnetizable particles are continuously oriented by the applied magnetic field with their longest axis being aligned substantially parallel (or antiparallel) with the magnetic field lines 465. Once transferred, the applied magnetic field may continue to exert an orienting influence on the magnetizable abrasive particles, although this is not requirement.

In general, applied magnetic fields used in practice of the present disclosure have a field strength in the region of the magnetizable particles being affected (e.g., attracted and/or oriented) of at least about 10 gauss (1 mT), at least about 100 gauss (10 mT), or at least about 1000 gauss (0.1 T), although this is not a requirement.

The applied magnetic field can be provided by one or more permanent magnets and/or electromagnet(s), or a combination of magnets and ferromagnetic members, for example. Suitable permanent magnets include rare-earth magnets comprising magnetizable materials are described hereinabove. The applied magnetic field can be static or variable (e.g., oscillating). The upper and/or lower magnetic members (452, 454), each having north (N) and south (S) poles, may be monolithic or they may be composed of multiple component magnets (454A, 454B) and/or magnetizable bodies, for example. If comprised of multiple magnets, the multiple magnets in a given magnetic member can be contiguous and/or co-aligned (e.g., at least substantially parallel) with respect to their magnetic field lines where the component magnets closest approach each other. Stainless steel retainers 456, 458A, and 458B retain the magnets in position. While stainless steel 304 or an equivalent is suitable due to its non-magnetic character, magnetizable materials may also be used. Mild steel mounts 462, 464 support the stainless steel retainers 456, 458A and 458B, respectively. While steel mounts are shown in FIG. 4 the mounts may be made of any dimensionally stable material(s) whether magnetizable or not.

The downward sloping dispensing surface may be inclined at any suitable angle, provided that the magnetizable particles can travel down the surface and be dispensed onto the web. Suitable angles may be in a range of from 15 to 60 degrees, although other angles may also be used. In some instances, it may be desirable to vibrate the downward sloping dispensing surface to facilitate particle movement.

The downward sloping dispensing surface may be constructed of any dimensionally stable material, that may be non-magnetizable. Examples include: metals such as aluminum; wood; and plastic.

Figure 5:
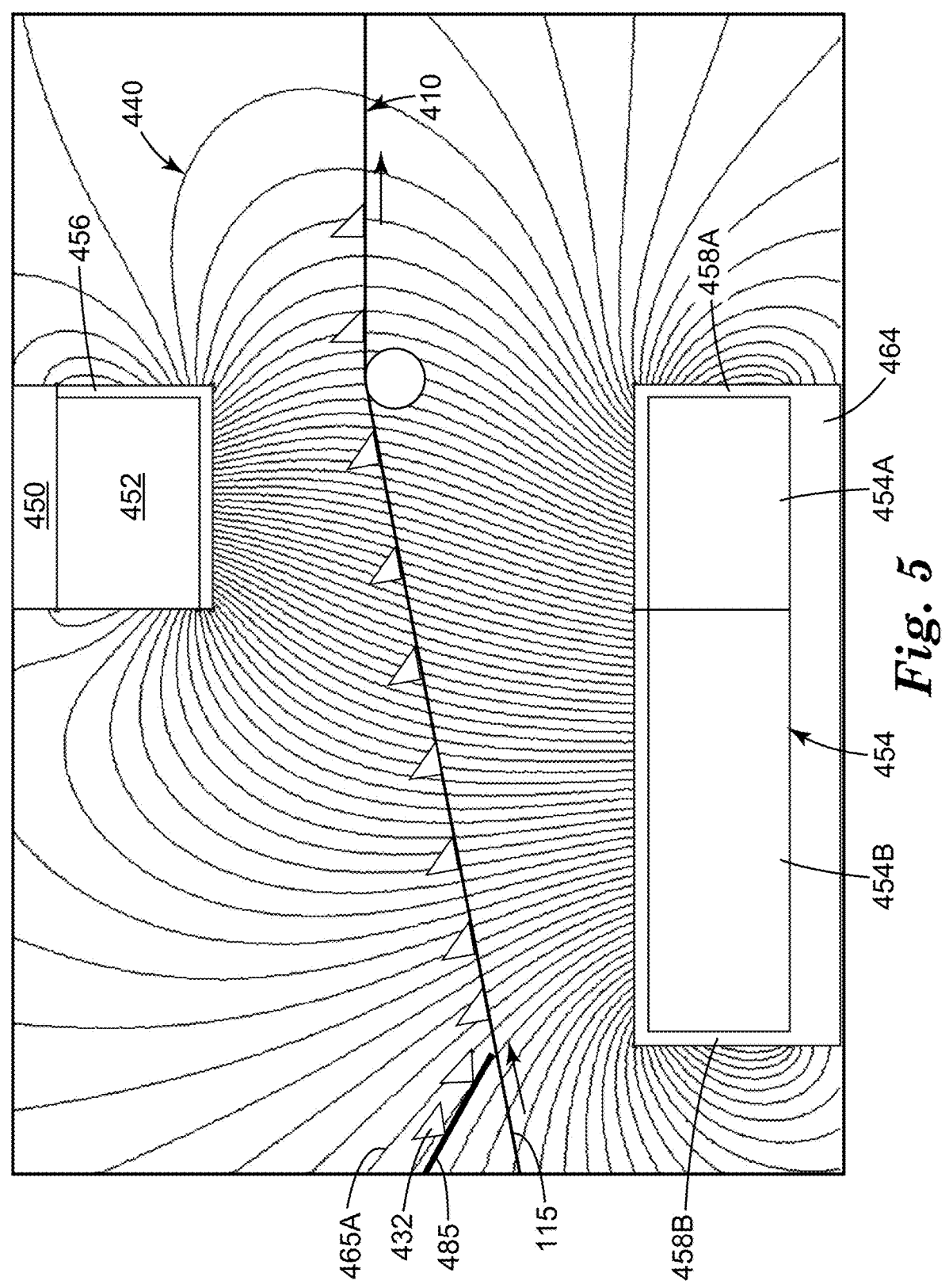
FIG. 5 is a schematic diagram showing a method of orienting a shaped abrasive particle according to the method of FIG. 4, in accordance with various embodiments.
Figure 6:
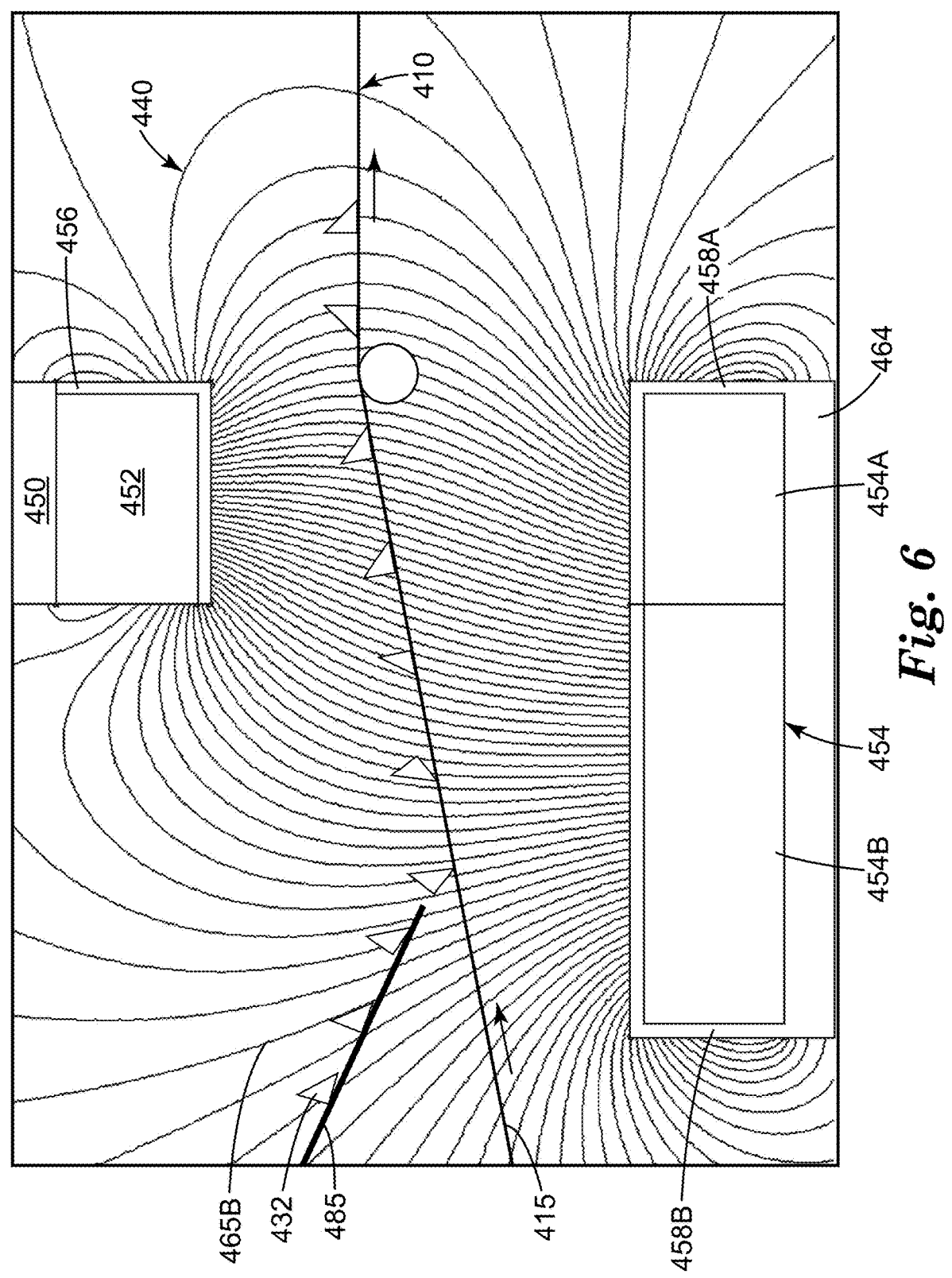
FIG. 6 is a schematic diagram showing a method of orienting of a shaped abrasive particle according to the method of FIG. 4, in accordance with various embodiments.
Figure 7:
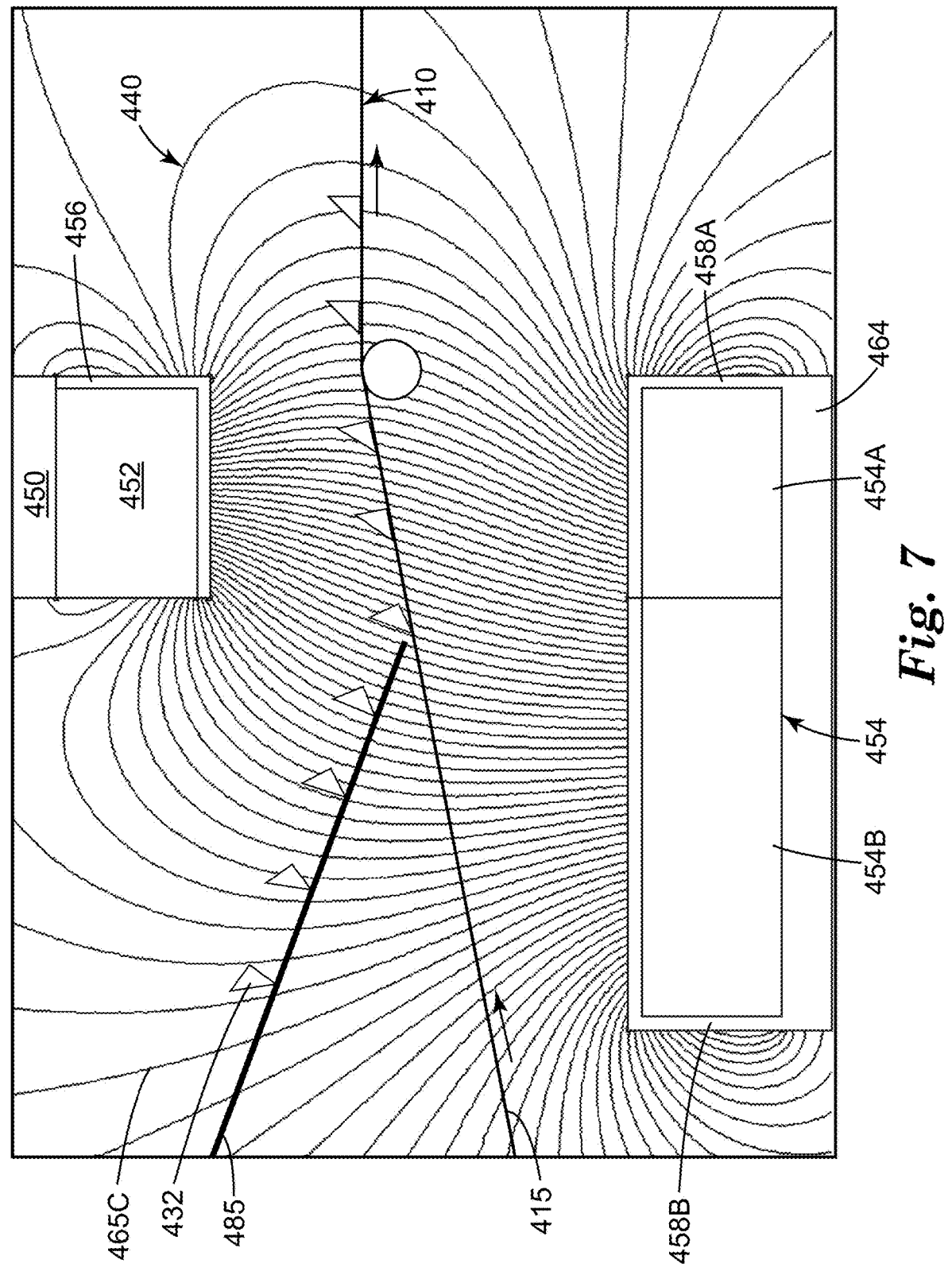
FIG. 7 is a schematic diagram is a schematic diagram showing a method of orienting a shaped abrasive particle according to the method of FIG. 4, in accordance with various embodiments.

FIGS. 5-7 depict the general process in FIG. 4 showing the alignment of the magnetizable particles 432 at the location of transfer from downward sloping dispensing surface 485 onto web 410 depending on the position of downward sloping dispensing surface 485 in the applied magnetic field 440.

For example, in the configuration shown in FIG. 5, magnetizable shaped abrasive particles 432 are dispensed onto web 410 where magnetic field lines 465A form a downweb angle with web 410 of less than 90 degrees such that when transferred to the web they attain an orientation with their long edges sloping upward from right to left. As shown, magnetizable shaped abrasive particles 432 slide down downward sloping dispensing surface 485 and begin to orient with their longest edge aligning with magnetic field lines 465. As magnetizable shaped abrasive particles 432 contact make layer precursor 420 of web 410, they are leaning downweb. Gravity and/or the lower magnetic member cause the magnetic shaped abrasive particles to sit down onto make layer precursor 420, and after curing they are subsequently adhered to backing 415. The majority of magnetizable shaped abrasive particles 432 are adhered with a nominal rake angle (e.g., the angle between the backing and the leading edge of a magnetizable shaped abrasive particle) in an indicated direction (e.g., upweb or downweb) of about 90 degrees in the upweb direction.

Referring now to the configuration shown in FIG. 6, magnetizable shaped abrasive particles 432 align such that when transferred to web 410 they attain an orientation with their longest edge sloping upward from either right to left or left to right. As magnetizable shaped abrasive particles 432 slide down downward sloping dispensing surface 485 and begin to orient with their longest edge aligning with magnetic field lines 465B. Magnetizable shaped abrasive particles 432 are dispensed onto web 410 where magnetic field lines 465 are approximately perpendicular to web 410. Magnetizable shaped abrasive particles 432 are disposed onto web 410 with their longest edges approximately perpendicular to the backing. This allows the particles to rotate about their longest edge. The lower magnetic member and/or gravity causes magnetizable shaped abrasive particles 432 to sit down onto make layer precursor 420, and after curing they are subsequently adhered to backing 415. Roughly equal percentages of the magnetizable shaped abrasive particles have a nominal 90 degree rake angle facing the downweb direction as facing the upweb direction In the configuration shown in FIG. 7, magnetizable shaped abrasive particles 432 align such that when transferred to the web they attain an orientation with their long edges sloping upward from left to right. As magnetizable shaped abrasive particles 432 slide down downward sloping dispensing surface 485, they begin to orient with their longest edge aligning with magnetic field lines 465. Magnetizable shaped abrasive particles 432 are dispensed on backing where magnetic field lines 465 an upweb angle with web 400 of greater than 90 degrees. As the particles contact the web, they are leaning forward in the downweb direction. The lower magnetic member and/or gravity causes magnetizable shaped abrasive particles 432 to sit down onto make layer precursor 420, and after curing they are subsequently adhered to backing 415. A majority of magnetizable shaped abrasive particles 432 become adhered to web 410 with a rake angle of about 90 degrees in the downweb direction.

Once the magnetizable particles are coated on to the curable binder precursor it is at least partially cured at a first curing station (not shown), so as to firmly retain the magnetizable particles in position. In some embodiments, additional magnetizable and/or non-magnetizable particles (e.g., filler abrasive particle and/or grinding aid particles) can be applied to the make layer precursor prior to curing.

In the case of a coated abrasive article, the curable binder precursor comprises a make layer precursor, and the magnetizable particles comprise magnetizable abrasive particles.

A size layer precursor may be applied over the at least partially cured make layer precursor and the magnetizable abrasive particles, although this is not a requirement. If present, the size layer precursor is then at least partially cured at a second curing station, optionally with further curing of the at least partially cured make layer precursor. In some embodiments, a supersize layer is disposed on the at least partially cured size layer precursor.

According to various embodiments, a method of using an abrasive article such as abrasive belt 200 or abrasive disc 300 includes contacting shaped abrasive particles 100 with a workpiece or substrate. The workpiece or substrate can include many different materials such as steel, steel alloy, aluminum, plastic, wood, or a combination thereof. Upon contact, one of the abrasive article and the workpiece is moved relative to one another in direction of use 202 or 304 and a portion of the workpiece is removed.

According to various embodiments, a cutting depth into the substrate or workpiece can be at least about 10 μm, at least about 20 μm, at least about 30 μm, at least about 40 μm, at least about 50 μm, or at least about 60 μm. A portion of the substrate or workpiece is removed by the abrasive article as a swarf.

According to various embodiments, a cutting speed of the abrasive article can be at least about 100 m/min, at least about 110 m/min, at least about 120 m/min, at least about 130 m/min, at least about 140 m/min, at least about 150 m/min, at least about 160 m/min at least about 170 m/min, at least about 180 m/min, at least about 190 m/min, at least about 200 m/min, at least about 300 m/min, at least about 400 m/min, at least about 500 m/min, at least about 1000 m/min, at least about 1500 m/min, at least about 2000 m/min, at least about 2500 m/min, at least about 3000 m/min, or at least about 4000 m/min.

Direction of use 202 or 304 is a first direction indicated as indicated in FIGS. 2A-2C and 3. It is possible for the abrasive article to be moved in a second direction that is different than direction of use 202 or 304. The second direction can be in a direction rotated about 1 degree to 360 degrees relative to direction of use 202 or 304, about 160 degrees to about 200 degrees, less than, equal to, or greater than about 1 degree, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 230, 240, 250, 260, 265, 270, 275, 280, 285, 290, 295, 300, 305, 310, 315, 320, 325, 330, 335, 340, 350, 355, or about 360 degrees.

According to various embodiments, the abrasive articles described herein can have several advantages when moved in direction of use 202 as opposed to any other direction of use. For example, at the same applied force, cutting speed, or a combination thereof, an amount of material removed from the workpiece, length of a swarf removed from the workpiece, depth of cut in the workpiece, surface roughness of the workpiece or a combination thereof is greater in the first direction than in any other second direction.

For example, at least about 10% more material is removed from the substrate or workpiece in the first direction of use, or at least about 15%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 100%, at least about 120%, at least about 130%, at least about 140%, at least about 150%. In some embodiments, about 15% to about 500% more material is removed in the first direction of use, or about 30% to about 70%, or about 40% to about 60%, or less than, equal to, or greater than about 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, 300%, 305%, 310%, 315%, 320%, 325%, 330%, 335%, 340%, 345%, 350%, 355%, 360%, 365%, 370%, 375%, 380%, 385%, 390%, 395%, 400%, 405%, 410%, 415%, 420%, 425%, 430%, 435%, 440%, 445%, 450%, 455%, 460%, 465%, 470%, 475%, 480%, 485%, 490%, 495%, or about 500%. The amount of material removed can be in reference to an initial cut (e.g., the first cut of a cutting cycle) or a total cut (e.g., a sum of the amount of material removed over a set number of cutting cycles).

As a further example, a depth of cut into the substrate or workpiece may be at least about 10% deeper in the first direction of use, or at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 100%, at least about 120%, at least about 130%, at least about 140%, at least about 150%. In some embodiments, about 10% to about 500% deeper in the first direction of use, or about 30% to about 70%, or about 40% to about 60%, or less than, equal to, or greater than about 15%, 20%, 25%, 30%, 35%, 40%, 45%, 50%, 55%, 60%, 65%, 70%, 75%, 80%, 85%, 90%, 95%, 100%, 105%, 110%, 115%, 120%, 125%, 130%, 135%, 140%, 145%, 150%, 155%, 160%, 165%, 170%, 175%, 180%, 185%, 190%, 195%, 200%, 205%, 210%, 215%, 220%, 225%, 230%, 235%, 240%, 245%, 250%, 255%, 260%, 265%, 270%, 275%, 280%, 285%, 290%, 295%, 300%, 305%, 310%, 315%, 320%, 325%, 330%, 335%, 340%, 345%, 350%, 355%, 360%, 365%, 370%, 375%, 380%, 385%, 390%, 395%, 400%, 405%, 410%, 415%, 420%, 425%, 430%, 435%, 440%, 445%, 450%, 455%, 460%, 465%, 470%, 475%, 480%, 485%, 490%, 495%, or about 500%.

As a further example an arithmetical mean roughness value (Sa) of the workpiece or substrate cut by moving the abrasive article in first direction of use 202 or 304 can be higher than a corresponding substrate or workpiece cut under the exact same conditions but in the second direction of movement. For example, the surface roughness can be about 30% greater when the workpiece or substrate is cut in the first direction or about 40% greater, about 50% greater, about 60% greater, about 70% greater, about 80% greater, about 90% greater, about 100% greater, about 110% greater, about 120% greater, about 130% greater, about 140% greater, about 150% greater, about 160% greater, about 170% greater, about 180% greater, about 190% greater, about 200% greater, about 210% greater, about 220% greater, about 230% greater, about 240% greater, about 250% greater, about 260% greater, about 270% greater, about 280% greater, about 290% greater, about 300% greater, about 310% greater, about 320% greater, about 330% greater, about 340% greater, about 350% greater, about 360% greater, about 370% greater, about 380% greater, about 390% greater, about 400% greater, about 410% greater, about 420% greater, about 430% greater, about 440% greater, about 450% greater, about 460% greater, about 470% greater, about 480% greater, about 490% greater, or about 500% greater. The arithmetical mean roughness value can be in a range of from about 1000 to about 2000, about 1000 to about 1100, or less than, equal to, or greater than about 1000, 1050, 1100, 1150, 1200, 1250, 1300, 1350, 1400, 1450, 1500, 1550, 1600, 1650, 1700, 1750, 1800, 1850, 1900, 1950, or about 2000.

Although it may be desirable to move the abrasive article in first direction of use 202 or 304, there are some reasons to move the abrasive article in a second direction of movement other than first direction of use 202 or 304. For example, contacting the substrate or workpiece with the abrasive article and moving the abrasive article in the second direction may be beneficial for finishing the substrate or workpiece. While not intending to be bound to any particular theory, the inventors hypothesize that movement in the second direction may expose the substrate or workpiece to relief angle 214, which has a different value than rake angle 206 that is more suited for finishing applications.

Examples

Various embodiments of the present disclosure can be better understood by reference to the following Examples which are offered by way of illustration. The present disclosure is not limited to the Examples given herein.

TABLE 1

| Materials | |
| --- | --- |
| MIN1 | Shaped abrasive particles were prepared according to the disclosure of U.S. Pat. No. 8,142,531(Adefris et al.). The shaped abrasive particles were prepared by molding alumina sol gel in tetrahedron shaped 3D printed mold cavities. A 3D printed mold was made by means of a stereolithography (SLA) 3D printer. Each individual cavity of the mold had the respective 4 points A, B, C, and D, with the following xyz coordinate positions in respect to a reference point toward the center of any given cavity in inches; Point A (0.0, −0.05, 0.05), Point B (0.0, 0.05, 0.05), Point C (0.05, 0.0, 0.0) and Point D (−0.05, 0.0, 0.0). This resulted in 2 edge lengths of 0.100 inches and 4 edge lengths of the tetrahedron at 0.866 inches. Each of the resultant 4 faces of the tetrahedron had identical side lengths and areas in comparison to any of the other 3 faces of the tetrahedron. A dihedral angle of about 90 degrees was measured between at least two of the faces. The external dimensions of the mold plate in inches were 6.0 × 4.0 × 0.125 and contained 1974 total cavities for making the tetrahedron particles. |
| MIN2 | Shaped abrasive particles were prepared identical to MIN1 particles except that all edge lengths of the tetrahedron mold cavities were at equal length of 0.9 inches. This resulted in an equilateral tetrahedron. |
| MAG1 | A Neodymium disc magnet with a strength rating of N52 and a size of 8.0 inches in diameter and 2.0 inches thick magnetized through its thickness, supplied by SM Magnetics. Pelham, Alabama. |

Example 1

MIN1 was coated with 304 stainless steel using physical vapor deposition with magnetron sputtering, 304 stainless steel sputter target, described by Barbee et al. in *Thin Solid Films*, 1979, vol. 63, pp. 143-150, deposited as the magnetic ferritic body centered cubic form. The apparatus used for preparation of 304 stainless steel film coated abrasive particles (e.g., magnetizable abrasive particles) was disclosed in U.S. Pat. No. 8,698,394 (McCutcheon et al.). 3592 grams of MIN1 were placed in a particle agitator that was disclosed in U.S. Pat. No. 7,727,931 (Brey et al., Column 13, line 60). The blade end gap distance to the walls of the agitator was 1.7 mm. The physical vapor deposition was carried out for 12 hours at 5.0 kilowatts at an argon sputtering gas pressure of 10 millitorr (1.33 pascal) onto MIN1. The density of the coated MIN1 was 3.912 grams per cubic centimeter (the density of the uncoated SAP was 3.887 grams per cubic centimeter). The weight percentage of metal coating in the coated abrasive particles was 0.65% and the coating thickness is 1 micron.

Several MIN1 particles were rested on top of a smooth plastic sheet. The smooth plastic sheet was translated back and forth over MAGI at a height of 10.0 inches above the top surface of MAGI. The particles responded to the magnet field and maintained at least one of the edges joining two faces in parallel alignment with the direction of the magnetic field lines. This resulted in the group of particles all sharing a common rotational directionality of their rake angle measured between a face of the particle and the smooth plastic sheet.

Example 2

MIN2 was coated with 304 stainless steel using physical vapor deposition with magnetron sputtering, 304 stainless steel sputter target, described by Barbee et al. in *Thin Solid Films,* 1979, vol. 63, pp. 143-150, deposited as the magnetic ferritic body centered cubic form. The apparatus used for preparation of 304 stainless steel film coated abrasive particles (e.g., magnetizable abrasive particles) was disclosed in U.S. Pat. No. 8,698,394 (McCutcheon et al.). 3592 grams of MIN1 were placed in a particle agitator that was disclosed in U.S. Pat. No. 7,727,931 (Brey et al., Column 13, line 60). The blade end gap distance to the walls of the agitator was 1.7 mm. The physical vapor deposition was carried out for 12 hours at 5.0 kilowatts at an argon sputtering gas pressure of 10 millitorr (1.33 pascal) onto MIN1. The density of the coated MIN1 was 3.912 grams per cubic centimeter (the density of the uncoated SAP was 3.887 grams per cubic centimeter). The weight percentage of metal coating in the coated abrasive particles was 0.65% and the coating thickness is 1 micron.

Using the same method as with MIN1 in Example 1, the MIN2 particles were rested on top of a smooth plastic sheet and translated over the top of MAGI while maintaining a distance of 10 inches above the magnet. The MIN2 particles did not share a common rotational directionality of their rake angle measured between a face of the particle and the smooth plastic sheet.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

Additional Embodiments

The following exemplary embodiments are provided, the numbering of which is not to be construed as designating levels of importance:

Embodiment 1 provides a shaped abrasive particle comprising:

at least four major faces; and at least six edges joining the four major faces;

one of the at least four major faces being a first rake face;

a second of the at least four major faces being a second rake face;

the first and second rake faces being predominantly joined along only one common edge;

wherein a dihedral angle between the first rake face and the second rake face is in a range of from about 71 degrees to about 170 degrees.

Embodiment 2 provides the shaped abrasive particle of Embodiment 1, wherein the dihedral angle is in a range of from about 80 degrees to about 135 degrees.

Embodiment 3 provides the shaped abrasive particle of any one of Embodiments 1 or 2, wherein the dihedral angle is in a range of from about 85 degrees to about 95 degrees.

Embodiment 4 provides the shaped abrasive particle of any one of Embodiments 1-3, wherein the dihedral angle is about 90 degrees.

Embodiment 5 provides the shaped abrasive particle of any one of Embodiments 1-4, wherein a dihedral angle between at least two major faces other than the first rake face and the second rake face is in a range of from about 80 degrees to about 170 degrees.

Embodiment 6 provides the shaped abrasive particle of Embodiment 5, wherein the dihedral angle is in a range of from about 80 degrees to about 135 degrees.

Embodiment 7 provides the shaped abrasive particle of any one of Embodiments 5 or 6, wherein the dihedral angle is in a range of from about 85 degrees to about 95 degrees.

Embodiment 8 provides the shaped abrasive particle of any one of Embodiments 5-7, wherein the dihedral angle is about 90 degrees.

Embodiment 9 provides the shaped abrasive particle of any one of Embodiments 1-8, wherein the dihedral angle between the first rake face and the second rake face is substantially the same as the dihedral angle between the at least two major faces other than the first rake face and the second rake face.

Embodiment 10 provides the shaped abrasive particle of any one of Embodiments 1-9, wherein each of the at least six edges independently have a length in a range of from about 0.01 mm to about 10 mm.

Embodiment 11 provides the shaped abrasive particle of any one of Embodiments 1-10, wherein each of the at least six edges independently have a length in a range of from about 0.03 mm to about 5 mm.

Embodiment 12 provides the shaped abrasive particle of any one of Embodiments 1-11, wherein each of the at least four major faces comprises a triangular shape bounded by a first edge, a second edge, and a third edge.

Embodiment 13 provides the shaped abrasive particle of Embodiment 12, wherein the triangular shape comprises a right triangle, a scalene triangle, an isosceles triangle, an acute triangle, or an obtuse triangle.

Embodiment 14 provides the shaped abrasive particle of any one of Embodiments 12 or 13, wherein the triangular shape is free of an equilateral triangle.

Embodiment 15 provides the shaped abrasive particle of any one of Embodiments 12-14, wherein the first edge differs by length from the second edge and the third edge, independently.

Embodiment 16 provides the shaped abrasive particle of Embodiment 15, wherein the first edge is shorter than the second edge and the third edge, independently.

Embodiment 17 provides the shaped abrasive particle of Embodiment 16, wherein the first edge is in a range of from about 1.5 times to about 10 times the length of the second edge and the third edge, independently.

Embodiment 18 provides the shaped abrasive particle of any one of Embodiments 16 or 17, wherein the first edge is in a range of from about 2 times to about 5 times the length of the second edge and the third edge, independently.

Embodiment 19 provides the shaped abrasive particle of Embodiment 15, wherein the first edge is longer than the second edge and the third edge, independently.

Embodiment 20 provides the shaped abrasive particle of Embodiment 19, wherein the first edge is in a range of from about 0.25 times to about 0.97 times the length of the second edge and the third edge, independently.

Embodiment 21 provides the shaped abrasive particle of any one of Embodiments 19 or 20, wherein the first edge is in a range of from about 0.4 times to about 0.97 times the length of the second edge and the third edge, independently.

Embodiment 22 provides the shaped abrasive particle of any one of Embodiments 15-21, wherein an angle between the first edge and the second edge and an angle between the first edge and the third edge are substantially equivalent.

Embodiment 23 provides the shaped abrasive particle of Embodiment 22, wherein the angle between the first edge and the second edge and an angle between the first edge and the third edge are in a range of from about 30 degrees to about 80 degrees.

Embodiment 24 provides the shaped abrasive particle of any one of Embodiments 22 or 23, wherein the angle between the first edge and the second edge and the angle between the first edge and the third edge are in a range of from about 45 degrees to about 60 degrees.

Embodiment 25 provides the shaped abrasive particle of Embodiment 24, wherein the first edge and the second edge, independently differ by length from the third edge.

Embodiment 26 provides the shaped abrasive particle of Embodiments 25, wherein the first edge and the second edge are independently shorter than the third edge.

Embodiment 27 provides the shaped abrasive particle of Embodiment 26, wherein the first edge and the second edge are independently in a range of from about 0.25 times shorter to about 0.97 times the length of the third edge.

Embodiment 28 provides the shaped abrasive particle of any one of Embodiments 26 or 27, wherein the first edge and the second edge are independently in a range of from about 0.4 times shorter to about 0.97 times the length of the third edge.

Embodiment 29 provides the shaped abrasive particle of Embodiments 25, wherein the first edge and the second edge are independently longer than the third edge.

Embodiment 30 provides the shaped abrasive particle of Embodiment 29, wherein the first edge and the second edge are independently in a range of from about 0.25 times longer to about 0.97 times the length of the third edge.

Embodiment 31 provides the shaped abrasive particle of any one of Embodiments 29 or 30, wherein the first edge and the second edge are independently in a range of from about 0.4 times longer to about 0.97 times the length of the third edge.

Embodiment 32 provides the shaped abrasive particle of any one of Embodiments 25-31, wherein an angle between the first edge and the second edge and an angle between the first edge and the third edge are different.

Embodiment 33 provides the shaped abrasive particle of Embodiment 25, wherein the angle between the first edge and the second edge and the angle between the first edge and the third edge are independently in a range of from about 30 degrees to about 85 degrees.

Embodiment 34 provides the shaped abrasive particle of any one of Embodiments 25 or 33, wherein the angle between the first edge and the second edge and an angle between the first edge and the third edge are independently in a range of from about 50 degrees to about 75 degrees.

Embodiment 35 provides the shaped abrasive particle of any one of Embodiments 1-34, wherein the shaped abrasive particle is a ceramic shaped abrasive particle.

Embodiment 36 provides the shaped abrasive particle of any one of Embodiments 1-35, wherein the shaped abrasive particle comprises alpha alumina, sol-gel derived alpha alumina, or a mixture thereof.

Embodiment 37 provides the shaped abrasive particle of any one of Embodiments 1-36, wherein the shaped abrasive particles comprises a fused aluminum oxide, a heat-treated aluminum oxide, a ceramic aluminum oxide, a sintered aluminum oxide, a silicon carbide material, a titanium diboride, a boron carbide, a tungsten carbide, a titanium carbide, a diamond, a cubic boron nitride, a garnet, a fused alumina-zirconia, a cerium oxide, a zirconium oxide, a titanium oxide or a combination thereof.

Embodiment 38 provides the shaped abrasive particle of any one of Embodiments 1-37, wherein the first rake face and the second rake face are the same in size by at least one of surface area, a largest length dimension, and a largest width dimension.

Embodiment 39 provides the shaped abrasive particle of any one of Embodiments 1-38, wherein at least one of the four major faces are planar.

Embodiment 40 provides the shaped abrasive particle of any one of Embodiments 1-39, wherein at least one of the four major faces are substantially non-planar.

Embodiment 41 provides the shaped abrasive particle of Embodiment 40, wherein at least one of the four major faces is convex.

Embodiment 42 provides the shaped abrasive particle of any one of Embodiments 40 or 41, wherein at least one of the four major faces is concave.

Embodiment 43 provides the shaped abrasive particle of any one of Embodiments 1-42, wherein the shaped abrasive particle comprises at least one shape feature comprising: an opening, a concave surface, a convex surface, a groove, a ridge, a fractured surface, a low roundness factor, or a perimeter comprising one or more corner points having a sharp tip.

Embodiment 44 provides the shaped abrasive particle of any one of Embodiments 1-43, wherein at least one of the at least six edges is tapered.

Embodiment 45 provides the shaped abrasive particle of any one of Embodiments 1-44, wherein the shaped abrasive particle is responsive to a magnetic field.

Embodiment 46 provides the shaped abrasive particle of any one of Embodiments 1-45, wherein the shaped abrasive particle comprises a magnetic material.

Embodiment 47 provides the shaped abrasive particle of Embodiment 46, wherein the magnetic material at least partially coats the shaped abrasive particle.

48 provides the shaped abrasive particle of any one of Embodiments 1-47, wherein the shaped abrasive particle is a monolithic shaped abrasive particle.

Embodiment 49 provides a method of making the shaped abrasive particle of any one of Embodiments 1-48, the method comprising:

disposing an abrasive particle precursor composition in a mold cavity conforming to the negative image of the shaped abrasive particle; and drying the abrasive particle precursor to form the shaped abrasive particle.

Embodiment 50 provides a method of making the shaped abrasive particle of any one of Embodiments 1-49, the method comprising:

additively manufacturing the shaped abrasive particle.

Embodiment 51 provides an abrasive article comprising:

a backing; and a plurality of the shaped abrasive particle of any one of Embodiment 1-48 or manufactured according to the methods of any one of Embodiments 49 or 50, attached to the backing.

Embodiment 52 provides the abrasive article of Embodiment 51, wherein one of the first rake face and the second rake face of an individual shaped abrasive particle is in contact with the backing.

Embodiment 53 provides the abrasive article of any one of Embodiments 51 or 52, wherein a dihedral angle between the backing and one of the first rake face and the second rake face of an individual shaped abrasive particle is in a range of from about 71 degrees to about 170 degrees.

Embodiment 54 provides the abrasive article of Embodiment 53, wherein a dihedral angle between the backing and one of the first rake face and the second rake face of an individual shaped abrasive particle is in a range of from about 80 degrees to about 135 degrees.

Embodiment 55 provides the abrasive article of any one of Embodiments 53 or 54, wherein a dihedral angle between the backing and one of the first rake face and the second rake face of an individual shaped abrasive particle is in a range of from about 85 degrees to about 95 degrees.

Embodiment 56 provides the abrasive article of any one of Embodiments 53-55, wherein a dihedral angle between the backing and one of the first rake face and the second rake face of an individual shaped abrasive particle is about 90 degrees.

Embodiment 57 provides the abrasive article of any one of Embodiments 53-56, wherein the dihedral angle of about 50 wt % to about 100 wt % of the shaped abrasive particles is substantially the same.

Embodiment 58 provides the abrasive article of any one of Embodiments 53-57, wherein the dihedral angle of about 90 wt % to about 100 wt % of the shaped abrasive particles is substantially the same.

Embodiment 59 provides the abrasive article of any one of Embodiments 1-58, wherein the abrasive article has a first direction of use along an x-axis.

Embodiment 60 provides the abrasive article of Embodiment 59, wherein one of the first rake face and the second rake face of an individual shaped abrasive particle is substantially aligned with the direction of use.

Embodiment 61 provides the abrasive article of any one of Embodiments 59 or 60, wherein a z-direction rotational angle of an individual shaped abrasive particle between a first line parallel to the first rake face and the second rake face and a second line parallel to the direction of use of the abrasive article is in a range of from about 10 degrees to about 170 degrees.

Embodiment 62 provides the abrasive article of any one of Embodiments 55 or 61, wherein a z-direction rotational angle of an individual shaped abrasive particle between a first line parallel to the first rake face and the second rake face and a second line parallel to the direction of use of the abrasive article is in a range of from about 80 degrees to about 110 degrees.

Embodiment 63 provides the abrasive article of any one of Embodiments 61 or 62, wherein a z-direction rotational angle of about 50% to about 100% of the shaped abrasive particles are independently within about 10 degrees of each other.

Embodiment 64 provides the abrasive article of any one of Embodiments 61-63, wherein a z-direction rotational angle of about 90% to about 100% of the shaped abrasive particles are independently within about 10 degrees of each other.

Embodiment 65 provides the abrasive article of any one of Embodiments 51-64, wherein the plurality of shaped abrasive particles comprise a first plurality of shaped abrasive particles and the abrasive article further comprises a second plurality of shaped abrasive particles that are free of the dihedral angle between the first rake face and the second rake face.

Embodiment 66 provides the abrasive article of Embodiment 65, wherein the second plurality of shaped abrasive particles comprises tetrahedral abrasive particles, triangular abrasive particles, or mixtures thereof.

Embodiment 67 provides the abrasive article of any one of Embodiments 65 or 66, wherein the first plurality of the shaped abrasive particles is in a range of from about 5 wt % to about 99 wt % of a blend of the first plurality of shaped abrasive particles and the second plurality of shaped abrasive particles.

Embodiment 68 provides the abrasive article of any one of Embodiments 65-67, wherein the first plurality of the shaped abrasive particles is in a range of from about 50 wt % to about 95 wt % of a blend of the first plurality of shaped abrasive particles and the second plurality of shaped abrasive particles.

Embodiment 69 provides the abrasive article of any one of Embodiments 65-68, wherein the abrasive particles of the first plurality and the second plurality comprise the same material or mixture of materials.

Embodiment 70 provides the abrasive article of any one of Embodiments 51-65, wherein the article comprises a blend of the shaped abrasive particles and crushed abrasive particles.

Embodiment 71 provides the abrasive article of Embodiment 70, wherein the shaped abrasive particles and the crushed abrasive particles comprise the same material or mixture of materials.

Embodiment 72 provides the abrasive article of Embodiment 70, wherein the shaped abrasive particles are in a range of from about 5 wt % to about 99 wt % of the blend.

Embodiment 73 provides the abrasive article of any one of Embodiments 70 or 72, wherein the shaped abrasive particles are in a range of from about 50 wt % to about 95 wt % of the blend.

Embodiment 74 provides the abrasive article of any one of Embodiments 51-73, wherein the abrasive article comprises a belt, a disc, or a sheet.

Embodiment 75 provides the abrasive article of any one of Embodiments 51-74, further comprising a make coat adhering the shaped abrasive particles to the backing.

Embodiment 76 provides the abrasive article of Embodiment 75, further comprising a size coat adhering the shaped abrasive particles to the make coat.

Embodiment 77 provides the abrasive article of any one of Embodiments 75 or 76, wherein at least one of the make coat and the size coat comprise a phenolic resin, an epoxy resin, a urea-formaldehyde resin, an acrylate resin, an aminoplast resin, a melamine resin, an acrylated epoxy resin, a urethane resin, or mixtures thereof.

Embodiment 78 provides the abrasive article of any one of Embodiments 75-77, wherein at least one of the make coat and the size coat comprises a filler, a grinding aid, a wetting agent, a surfactant, a dye, a pigment, a coupling agent, an adhesion promoter, or a mixture thereof.

Embodiment 79 provides the abrasive article of Embodiment 78, wherein the filler comprises calcium carbonate, silica, talc, clay, calcium metasilicate, dolomite, aluminum sulfate, or a mixture thereof.

Embodiment 80 provides the abrasive article of any one of Embodiments 78-79, wherein the abrasive article comprises a disc and the z-direction rotational angle positions the leading surface circumferentially.

Embodiment 81 provides the abrasive article of any one of Embodiments 78-80, wherein the abrasive article comprises a sheet or a belt and the z-direction rotational angle positions the rake face at an angle such that a pattern created by the shaped abrasive particles comprises a plurality of parallel lines.

Embodiment 82 provides the abrasive article of any one of Embodiments 51-81, wherein a dihedral angle between the backing and at least one major face of 100 percent of the shaped abrasive particles is in a range of from about 71 degrees to about 170 degrees.

Embodiment 83 provides a method of making the abrasive article of any one of Embodiments 51-82, the method comprising:

adhering the shaped abrasive particles to the backing.

Embodiment 84 provides the method of Embodiment 83, further comprising orienting at least one of the shaped abrasive particles.

Embodiment 85 provides the method of Embodiment 84, wherein orienting the shaped abrasive particles comprises depositing at least one of the shaped abrasive particles in a cavity of the backing that is shaped to result in at least one shaped abrasive particle having a predetermined z-direction rotational orientation.

Embodiment 86 provides the method of Embodiment 84, wherein orienting the shaped abrasive particles comprises passing the at least one of the shaped abrasive particles through a screen to result in the at least one shaped abrasive particle having a predetermined z-direction rotational orientation.

Embodiment 87 provides the method of Embodiment 84, wherein orienting the at least one shaped abrasive particle comprises placing the at least one shaped abrasive particle in an individual cavity of a transfer tool and contacting the at least one shaped abrasive particle with the backing to result in the at least one shaped abrasive particle having a predetermined z-direction rotational orientation.

Embodiment 88 provides the method of Embodiment 83, wherein orienting the at least one shaped abrasive particle comprises exposing at least one shaped abrasive particle to a magnetic field.

Embodiment 89 provides the method of Embodiment 88, further comprising rotating the at least one shaped abrasive particle in the magnetic field.

Embodiment 90 provides the method of any one of Embodiments 83-89, wherein adhering the shaped abrasive particles to the backing comprises contacting the shaped abrasive particles with a make coat disposed over at least a portion of the backing.

Embodiment 91 provides the method of Embodiment 90, wherein adhering the shaped abrasive particles to the backing further comprises disposing a size coat over at least a portion of the shaped abrasive particles and at least one of the make coat and the backing.

Embodiment 92 provides a method of using the abrasive article according to any one of Embodiments 1-50 or made according to the method of any one of Embodiments 51-91, the method comprising:

contacting the shaped abrasive particles with a workpiece;
moving at least one of the abrasive article and the workpiece relative to each other in the direction of use; and
removing a portion of the workpiece.

Embodiment 93 provides the method of Embodiment 92, wherein a cutting tip of the at least one of the shaped abrasive particles contacts the workpiece.

Embodiment 94 provides the method of any one of Embodiments 92 or 93, wherein the direction of use is a first direction and under the same testing conditions the amount of material removed from the workpiece is greater in the first direction than in a second direction different than the first direction.

Embodiment 95 provides the method of any one of Embodiments 92-94, wherein the direction of use is a first direction and under the same testing conditions the amount of force required to remove the same amount of material from the workpiece is less than the amount of force required to remove the same amount of material at the same infeed rate when the direction of use is a second direction different than the first direction.

Embodiment 96 provides the method of any one of Embodiments 92-95, wherein the article is moved in the second direction to impart a finer finish on the work piece than the finish imparted to workpiece when the article is moved in the first direction Embodiment 97 provides the method of any one of Embodiments 92-96, wherein the direction of use is a linear direction or a rotational direction.

Embodiment 98 provides the method of Embodiment 97, wherein the direction of use is a rotational direction and the z-direction rotational angle is between the line intersecting the rake face and a line tangent to the rotational direction.

Embodiment 99 provides the method of Embodiment 97, wherein the abrasive article is a belt or a sheet and the direction of use is along an x-axis that is orthogonal to a y-axis and the z-axis.

Embodiment 100 provides the method of any one of Embodiments 92-99, wherein the workpiece comprises steel, aluminum, alloys thereof, wood, or mixtures thereof.

Embodiment 101 provides the method of any one of Embodiments 92-100, wherein an amount of workpiece material removed at an applied force to the abrasive article is greater than a corresponding abrasive article comprising shaped abrasive particles comprising equilateral triangles.

What is claimed is:

1. An abrasive article comprising:
a backing; and
a plurality of tetrahedral-shaped ceramic abrasive particles, wherein the plurality of tetrahedral-shaped ceramic abrasive particles are monolithic, shaped abrasive particles, and wherein each of the tetrahedral-shaped ceramic abrasive particles comprises:

at least four major faces, wherein each of the at least four major faces comprises a triangular shape;

at least six edges joining the four major faces;

one of the at least four major faces being a first rake face, a second of the at least four major faces being a second rake face, and the first and second rake faces being joined along a first edge having a first length, the second rake face and a third major face being joined along a second edge, and the third major face and a fourth major face being joined by a third edge having a third length, wherein the first length of the first edge is in a range of from about 1.03 times to about 2 times the second length of the second edge and the third length of the third edge;

wherein a dihedral angle between the first rake face and the second rake face is in a range of from about 71 degrees to about 170 degrees; and wherein each of the plurality of tetrahedral-shaped ceramic abrasive particles comprises a magnetic material or is coated with a magnetic material such that each of the plurality of tetrahedral-shaped ceramic abrasive particles is responsive to a magnetic field to provide a precise orientation of the plurality of tetrahedral-shaped ceramic abrasive particles on the backing.

2. The abrasive article of claim 1, wherein a dihedral angle between the backing and one of the first rake face and the second rake face of an individual tetrahedral-shaped ceramic abrasive particle is in a range of from about 80 degrees to about 135 degrees.

3. The abrasive article of claim 1, wherein a dihedral angle between the backing and one of the first rake face and the second rake face of an individual tetrahedral-shaped ceramic abrasive particle is about 90 degrees.

4. The abrasive article of claim 1, wherein the dihedral angle between the first rake face and the second rake face of about 50 wt % to about 100 wt % of the tetrahedral-shaped ceramic abrasive particles is the same.

5. The abrasive article of claim 1, wherein one of the first rake face and the second rake face of an individual tetrahedral-shaped ceramic abrasive particle is substantially aligned with the direction of use.

6. The abrasive article of claim 1, wherein the tetrahedral-shaped ceramic abrasive particles are sol-gel derived abrasive particles.

7. The abrasive article of claim 1, wherein the tetrahedral-shaped ceramic abrasive particles comprise alpha-alumina.

8. The abrasive article of claim 1, wherein the tetrahedral-shaped ceramic abrasive particles are adhered to the backing by a make coat, the make coat comprising: a phenolic resin, an epoxy resin, a urea-formaldehyde resin, an acrylate resin, an aminoplast resin, a melamine resin, an acrylated epoxy resin, or a urethane resin.

9. A method of making the abrasive article of claim 1, the method comprising:

adhering the plurality of tetrahedral-shaped ceramic abrasive particles to the backing.

10. A method of using the abrasive article according to claim 1, the method comprising:

contacting the plurality of tetrahedral-shaped ceramic abrasive particles with a workpiece;

moving at least one of the abrasive article and the workpiece relative to each other in the direction of use; and removing a portion of the workpiece.

* * * * *